(12) United States Patent
Oyama et al.

(10) Patent No.: US 12,545,259 B2
(45) Date of Patent: Feb. 10, 2026

(54) CONTROL SYSTEM FOR VEHICLES

(71) Applicant: SUBARU CORPORATION, Tokyo (JP)

(72) Inventors: Hajime Oyama, Tokyo (JP); Fumihito Yamaguchi, Tokyo (JP); Kazuki Ishii, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 99 days.

(21) Appl. No.: 18/692,764

(22) PCT Filed: Oct. 20, 2022

(86) PCT No.: PCT/JP2022/039061
§ 371 (c)(1),
(2) Date: Mar. 15, 2024

(87) PCT Pub. No.: WO2024/084645
PCT Pub. Date: Apr. 25, 2024

(65) Prior Publication Data
US 2025/0136116 A1    May 1, 2025

(51) Int. Cl.
*B60W 30/18*  (2012.01)
*B60W 60/00*  (2020.01)

(52) U.S. Cl.
CPC .... *B60W 30/18163* (2013.01); *B60W 60/001* (2020.02)

(58) Field of Classification Search
CPC .......... B60W 30/18163; B60W 60/001; G08G 1/09; G01C 21/00; G05D 1/00
See application file for complete search history.

(56) References Cited

U.S. PATENT DOCUMENTS

| 4,284,941 | A | * | 8/1981 | Regueiro | G05D 1/0265 318/16 |
| 6,237,500 | B1 | * | 5/2001 | Lund | B61L 3/225 104/88.01 |
| 10,235,881 | B2 | * | 3/2019 | Nishi | G01S 13/931 |

(Continued)

FOREIGN PATENT DOCUMENTS

| JP | 2019079376 A | * | 5/2019 | ............... G08G 1/09 |
| JP | 2020-160885 A | | 10/2020 | |
| JP | 2021135711 A | * | 9/2021 | |

OTHER PUBLICATIONS

JP-2021135711-A machine translation (Year: 2021).*

(Continued)

*Primary Examiner* — Angelina M Shudy
(74) *Attorney, Agent, or Firm* — Rimon P.C.

(57) ABSTRACT

In a control system for vehicles, a pre-processor of a server apparatus accumulates and records travel information received from each of the multiple vehicles in a database. A control information generator determines interference with respect to each vehicle traveling toward a merging section, based on the travel information in the database, generates individual control information, and individually transmits the individual control information. The control information generator further generates information regarding waypoints in the merging section, with respect to each vehicle traveling toward the merging section, and individually transmits the information regarding the waypoints.

17 Claims, 14 Drawing Sheets

(56) References Cited

U.S. PATENT DOCUMENTS

| | | | | |
|---|---|---|---|---|
| 11,433,898 B2* | 9/2022 | Sato | | B60W 50/14 |
| 12,027,039 B2* | 7/2024 | Oyama | | G05D 1/248 |
| 12,103,568 B2* | 10/2024 | Mizoguchi | | B60W 60/001 |
| 2006/0271252 A1* | 11/2006 | Hori | | G05D 1/0297 |
| | | | | 180/169 |
| 2010/0228389 A1* | 9/2010 | Hayashi | | G05D 1/0297 |
| | | | | 700/229 |
| 2013/0197719 A1* | 8/2013 | Nagasawa | | B61L 27/20 |
| | | | | 701/2 |
| 2014/0309913 A1* | 10/2014 | Ricci | | G08B 29/188 |
| | | | | 701/117 |
| 2015/0221222 A1* | 8/2015 | Hamada | | G08G 1/164 |
| | | | | 701/2 |
| 2019/0028862 A1* | 1/2019 | Futaki | | H04W 4/44 |
| 2019/0035275 A1* | 1/2019 | Nishi | | G08G 1/163 |
| 2019/0384319 A1* | 12/2019 | Sakagami | | G01C 21/3602 |
| 2020/0022070 A1* | 1/2020 | Yoshimura | | H04W 24/02 |
| 2020/0208998 A1* | 7/2020 | Xiang | | G06F 16/29 |
| 2020/0211377 A1* | 7/2020 | Chen | | G08G 1/0133 |
| 2020/0307600 A1* | 10/2020 | Sato | | G08G 1/167 |
| 2020/0394918 A1* | 12/2020 | Chen | | G01C 21/3811 |
| 2021/0064041 A1* | 3/2021 | Kim | | B60W 30/18159 |
| 2021/0201662 A1* | 7/2021 | Oyama | | G01C 21/28 |
| 2021/0201674 A1* | 7/2021 | Oyama | | G08G 1/207 |
| 2021/0201679 A1* | 7/2021 | Kuwahara | | G01C 21/3807 |
| 2021/0201682 A1* | 7/2021 | Oyama | | G08G 1/0112 |
| 2021/0201684 A1* | 7/2021 | Oyama | | G08G 1/09675 |
| 2021/0204188 A1* | 7/2021 | Oyama | | G08G 1/096775 |
| 2021/0339776 A1* | 11/2021 | Keshavamurthy | | |
| | | | | G01C 21/3461 |
| 2022/0009493 A1* | 1/2022 | Mizoguchi | | G06V 20/58 |
| 2022/0063669 A1* | 3/2022 | Fukushige | | B60W 60/00253 |
| 2022/0111858 A1* | 4/2022 | Ran | | G06V 20/56 |
| 2022/0204047 A1* | 6/2022 | Mizoguchi | | B60W 60/0059 |
| 2022/0250654 A1* | 8/2022 | Zhang | | G08G 1/20 |
| 2022/0375337 A1* | 11/2022 | Ran | | G08G 1/0145 |
| 2023/0274637 A1* | 8/2023 | Mizoguchi | | G08G 1/052 |
| | | | | 701/119 |
| 2023/0306851 A1* | 9/2023 | Mizoguchi | | B60W 40/105 |
| 2023/0331243 A1* | 10/2023 | White | | B60W 60/0015 |
| 2024/0025659 A1* | 1/2024 | Ueda | | B65G 43/10 |
| 2024/0071223 A1* | 2/2024 | Oyama | | G08G 1/164 |
| 2024/0321093 A1* | 9/2024 | Oyama | | G08G 1/096725 |
| 2024/0355202 A1* | 10/2024 | Oyama | | G08G 1/0145 |
| 2025/0037580 A1* | 1/2025 | Yamaguchi | | G08G 1/09 |
| 2025/0037581 A1* | 1/2025 | Yamaguchi | | G08G 1/096766 |
| 2025/0136116 A1* | 5/2025 | Oyama | | B60W 30/18163 |

OTHER PUBLICATIONS

JP-2019079376-A machine translation (Year: 2019).*
International Search Report received in PCT Application No. PCT/JP2022/039061, dated Jan. 10, 2023.

* cited by examiner

[FIG. 11]
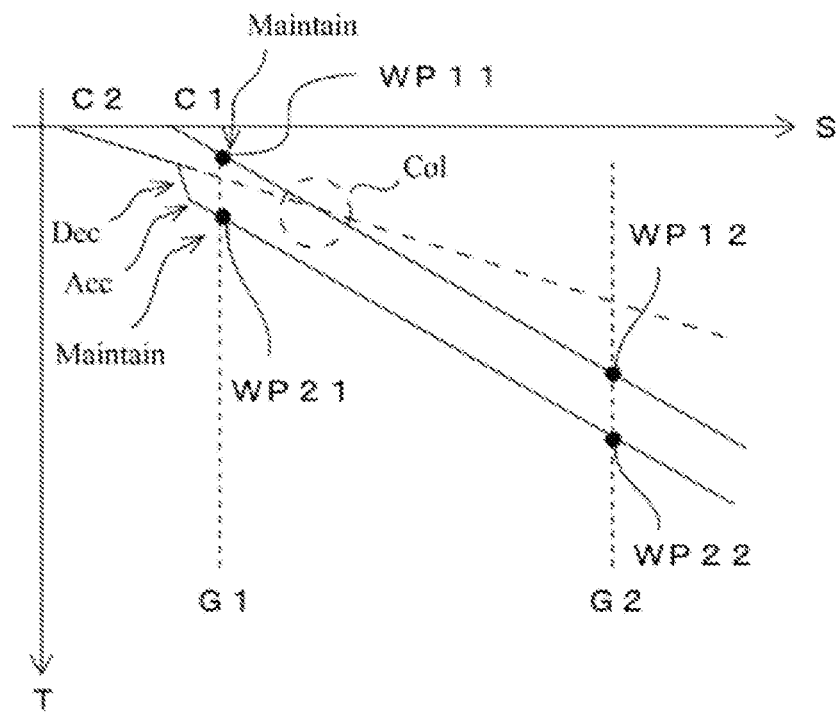
[FIG. 12]
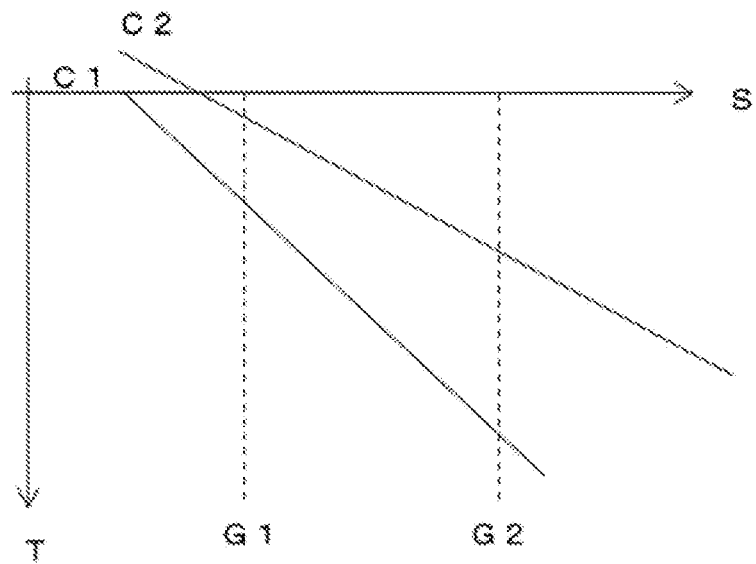

[ FIG. 13 ]
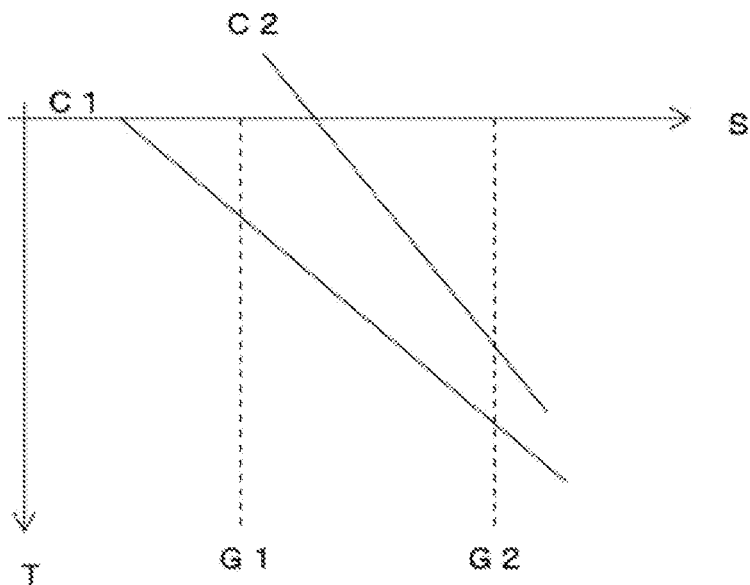
[ FIG. 14 ]
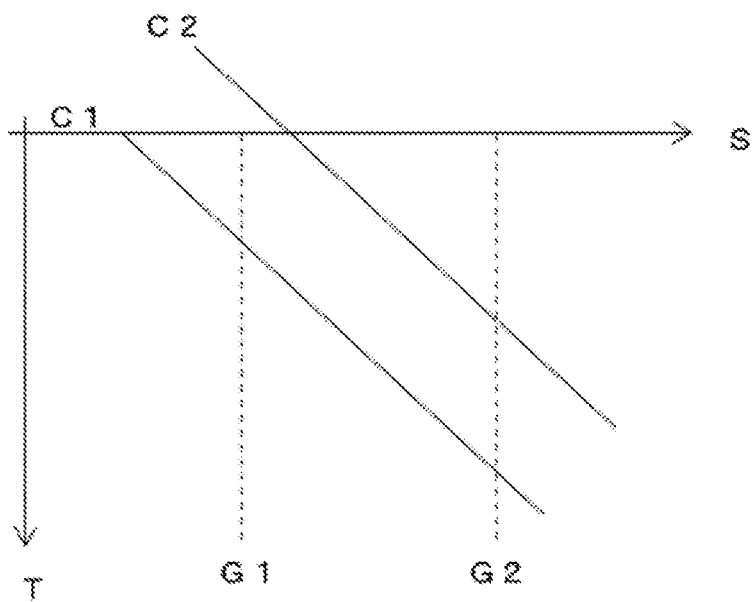

[ FIG. 15 ]
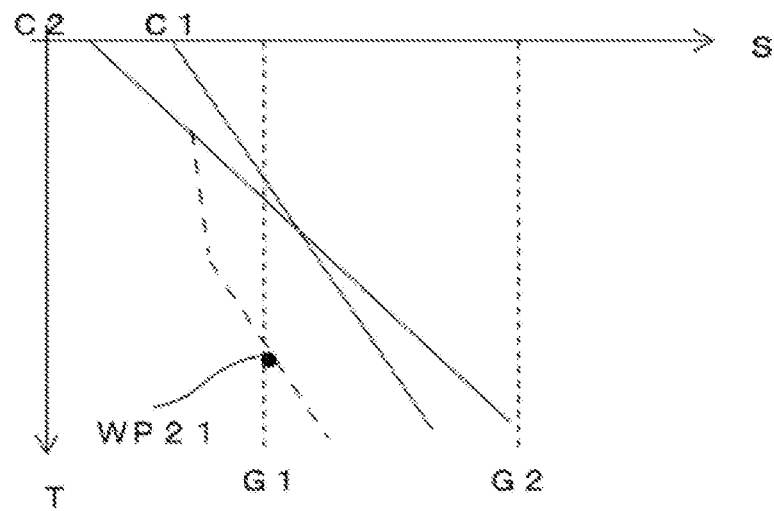
[ FIG. 16 ]
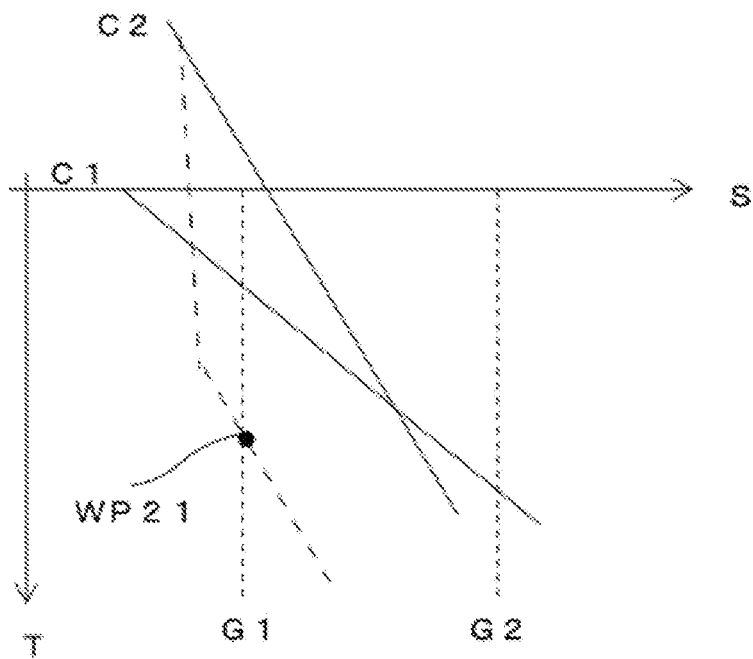

[ FIG. 17 ]
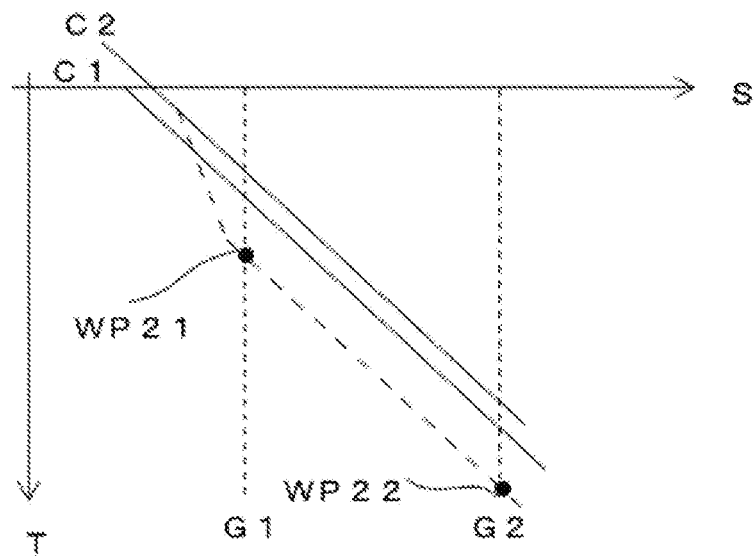
[ FIG. 18 ]
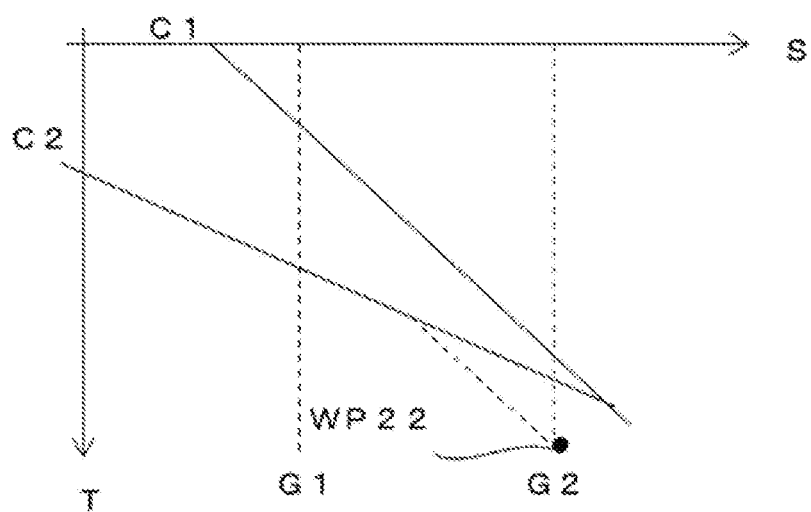

[ FIG. 19 ]
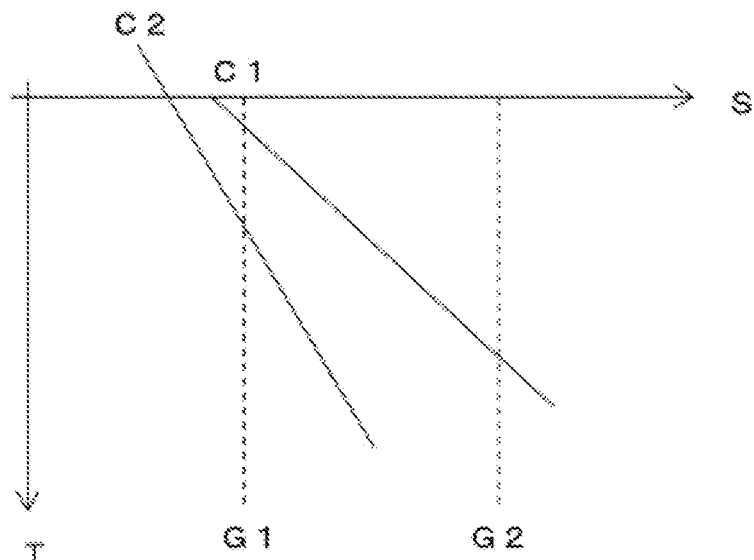
[ FIG. 20 ]
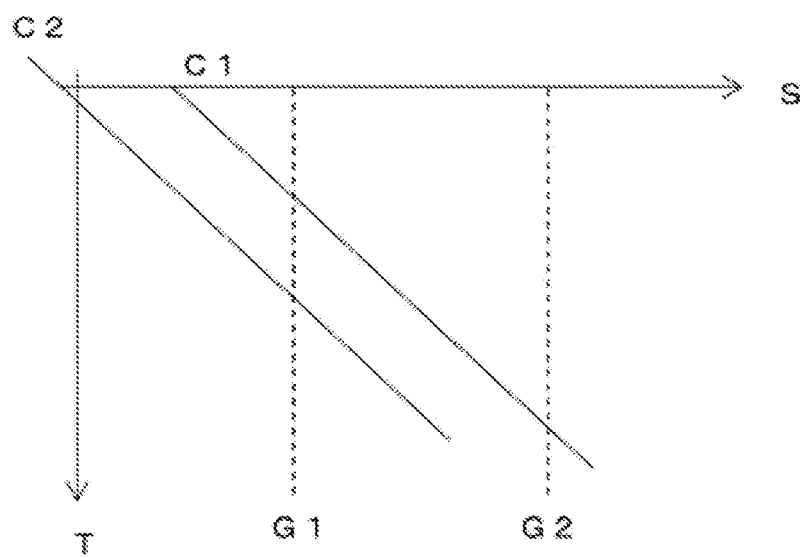

[FIG. 21]
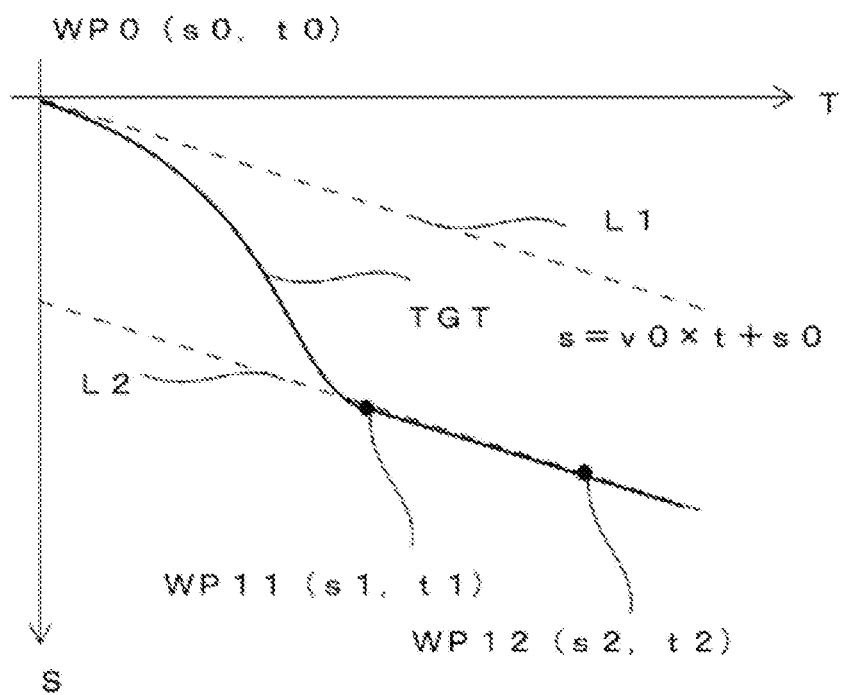
[FIG. 22]
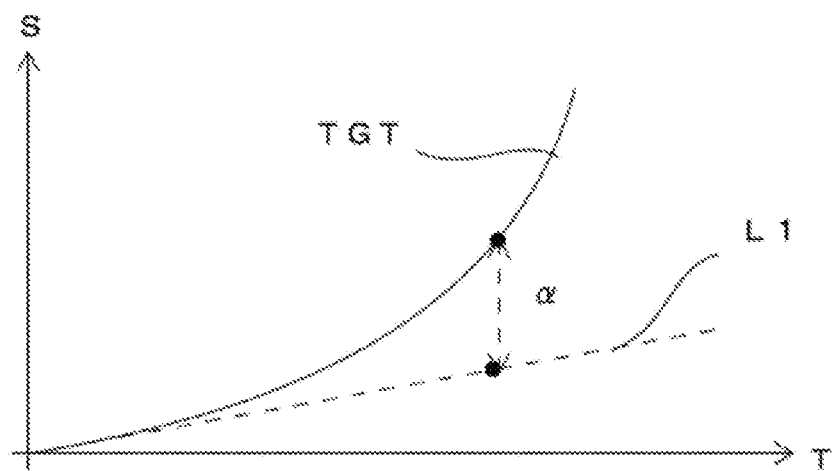

CONTROL SYSTEM FOR VEHICLES

CROSS-REFERENCE TO RELATED APPLICATIONS

This application is the U.S. National Phase under 35 U.S.C. § 371 of International Application No. PCT/JP2022/039061, filed on Oct. 20, 2022.

TECHNICAL FIELD

The invention relates to a control system for vehicles.

BACKGROUND ART

In vehicles such as automobiles, earnest research and development aimed at automated driving has been in progress (Patent Literature 1).

In Patent Literature 1, a control device is used that communicates with a vehicle control device of an automobile.

CITATION LIST

Patent Literature

Patent Literature 1: Japanese Unexamined Patent Application Publication No. 2020-160885

SUMMARY OF INVENTION

Problem to be Solved by the Invention

For example, when controlling travel of a vehicle by automated driving by using a server apparatus such as the control device in Patent Literature 1, the server apparatus basically has to collect travel information regarding multiple vehicles, determine interference, etc. between vehicles based on the collected travel information, generate individual control information regarding each vehicle, and individually transmit the generated control information to each vehicle. The server apparatus controls the travel of each vehicle by using information that is unobtainable in a visual field of each vehicle. This conceivably leads to enhanced safety and smoothness of the travel of each vehicle, as compared with a travel control under the visual field of each vehicle.

However, in the control by using such a server apparatus, what is desired is to maintain a constantly optimal communication state between the server apparatus and each vehicle.

Meanwhile, for example, each vehicle moving by traveling has to establish a wireless communication path with a base station provided along a road, etc., and transmit and receive information to and from the server apparatus by using the wireless communication path.

Moreover, information for other purposes is often transmitted and received through a communication network between the server apparatus and the base station although a degree varies depending on, for example, a position of installation of the server apparatus with respect to the base station.

It is not possible to disaffirm that these uncertainties, etc. in the communication system may cause occurrence of, if not constant interruption, temporary interruption of the communication between the server apparatus and each vehicle.

Moreover, in case of the occurrence of such a failure in the communication state, when the vehicle is traveling in a section in which interference with other vehicles easily occurs, e.g., a merging section, the vehicle is prevented from being under continuous control of the server apparatus. This conceivably causes a concern about the travel of the vehicle.

As described, as for a control system for vehicles, even in case of occurrence of temporary interruption of communication between a vehicle traveling in a merging section and a server apparatus, it is desired to keep travel of the vehicle in the merging section in a control state under control, and to suppress a concern about the travel in the merging section.

Means for Solving the Problem

A control system for vehicles according to an aspect of the invention includes: multiple vehicles each including a travel controller configured to generate a control value to control travel of a vehicle as a subject vehicle; and a server apparatus configured to generate individual control information regarding each of the multiple vehicles based on travel information regarding the multiple vehicles, and individually transmits the individual control information to each of the multiple vehicles. The travel controller of each of the vehicles is configured to, on the condition that the travel controller of each of the multiple vehicles receives the individual control information addressed to the subject vehicle from the server apparatus, repetitively generate the control value for a travel control of the subject vehicle by using the received individual control information addressed to the subject vehicle, to control the travel of the subject vehicle. The server apparatus includes a server communication device, a database, a pre-processor, and a control information generator. The server communication device is configured to receive the travel information from each of the multiple vehicles. The database is configured to accumulate and hold the travel information regarding each of the multiple vehicles. The pre-processor is configured to record, on the condition that the server communication device receives the travel information, information regarding at least a travel position of the vehicle related to the travel information, in the database. The control information generator is configured to periodically generate the individual control information regarding each of the multiple vehicles by using the information held in the database. The control information generator is configured to determine interference with another vehicle, with respect to each of the vehicles traveling toward a merging section in which vehicles merge, based on the travel information regarding the multiple vehicles held in the database. The control information generator is configured to generate, as the individual control information regarding each of the vehicles traveling toward the merging section, information including (a flag indicating) a determination result as to the interference, and individually transmits the individual control information. The control information generator is configured to further generate information regarding a waypoint to be passed by in the merging section, with respect to the vehicles traveling toward the merging section, and individually transmit the information regarding the waypoint. The waypoint is a point closer to an end point of the merging section than a current position.

Effects of the Invention

In the invention, the server apparatus determines interference with another vehicle, with respect to each of the vehicles traveling toward the merging section in which vehicles merge, based on the travel information regarding the multiple vehicles held in the database. The server apparatus generates, as the individual control information regarding each of the vehicles traveling toward the merging section, the information including the determination result as to the interference, and individually transmits the individual control information. This makes it possible for each of the vehicles to control the travel of the subject vehicle by using the individual control information individually generated for each vehicle by the server apparatus. As to the travel of the vehicles, it is possible to allow the vehicles to travel under the control of the server apparatus without causing the interference with other vehicles even when traveling in, for example, the merging section.

Moreover, the server apparatus further generates the information regarding the waypoint to be passed by in the merging section, with respect to the vehicles traveling toward the merging section, and individually transmits the information regarding the waypoint. The waypoint is a point closer to the end point of the merging section than the current position.

This makes it possible for each vehicle to carry out the autonomous travel control, by using the information regarding the waypoint in the merging section that has been already received from the server apparatus that carries out the control, even when the vehicle is prevented from receiving a new piece of the individual control information because of, for example, temporary interruption of the communication with the server apparatus and prevented from carrying out the travel control based on the control by using the individual control information from the server apparatus.

Moreover, after that, when the vehicle becomes able to receive the individual control information from the server apparatus, because the previous autonomous travel uses the information regarding the waypoint received from the server apparatus that carries out the control, it is possible to switch the travel control of each vehicle to restore the travel control based on the individual control information from the server apparatus. The travel controls before and after the switching of the control are both based on the information generated by the server apparatus that carries out the control. Accordingly, the travel of the vehicle on the occasion of the switching of the control is inhibited from making discontinuous switching of the control that may result in a significant change in the travel. Each vehicle carries out the autonomous travel under the control of the server apparatus even when each vehicle is inhibited from receiving a new piece of the individual control information from the server apparatus. This makes it possible to smoothly restore the travel control based on the individual control information from the server apparatus.

As described, in the invention, even in case of the occurrence of the temporary interruption of the communication between the vehicle traveling in the merging section and the server apparatus, it is possible to keep the travel of the vehicle in the merging section in the control state under control. Hence, it is possible to suppress the concern about the travel in the merging section.

BRIEF DESCRIPTION OF DRAWINGS

FIG. 11 is an explanatory diagram of an S-chart to control the first automobile and the second automobile in FIG. 9.

FIG. 12 is an explanatory diagram of an S-chart of a first example of an interference determination between the first automobile and the second automobile that merge.

FIG. 13 is an explanatory diagram of an S-chart of a second example of the interference determination between the first automobile and the second automobile that merge.

FIG. 14 is an explanatory diagram of an S-chart of a third example of the interference determination between the first automobile and the second automobile that merge.

FIG. 15 is an explanatory diagram of an S-chart of a fourth example of the interference determination between the first automobile and the second automobile that merge.

FIG. 16 is an explanatory diagram of an S-chart of a fifth example of the interference determination between the first automobile and the second automobile that merge.

FIG. 17 is an explanatory diagram of an S-chart of a sixth example of the interference determination between the first automobile and the second automobile that merge.

FIG. 18 is an explanatory diagram of an S-chart of a seventh example of the interference determination between the first automobile and the second automobile that merge.

FIG. 19 is an explanatory diagram of an S-chart of an eighth example of the interference determination between the first automobile and the second automobile that merge.

FIG. 20 is an explanatory diagram of an S-chart of a ninth example of the interference determination between the first automobile and the second automobile that merge.

FIG. 21 is an explanatory diagram of an example of an S-chart to be used in carrying out a waypoint-based travel control in the automobile.

FIG. 22 is an explanatory diagram of an example of calculation processing to obtain a control value of an acceleration rate of the automobile.

MODES FOR CARRYING OUT THE INVENTION

In the following, some embodiments of the invention are described with reference to the drawings.

Figure 1:
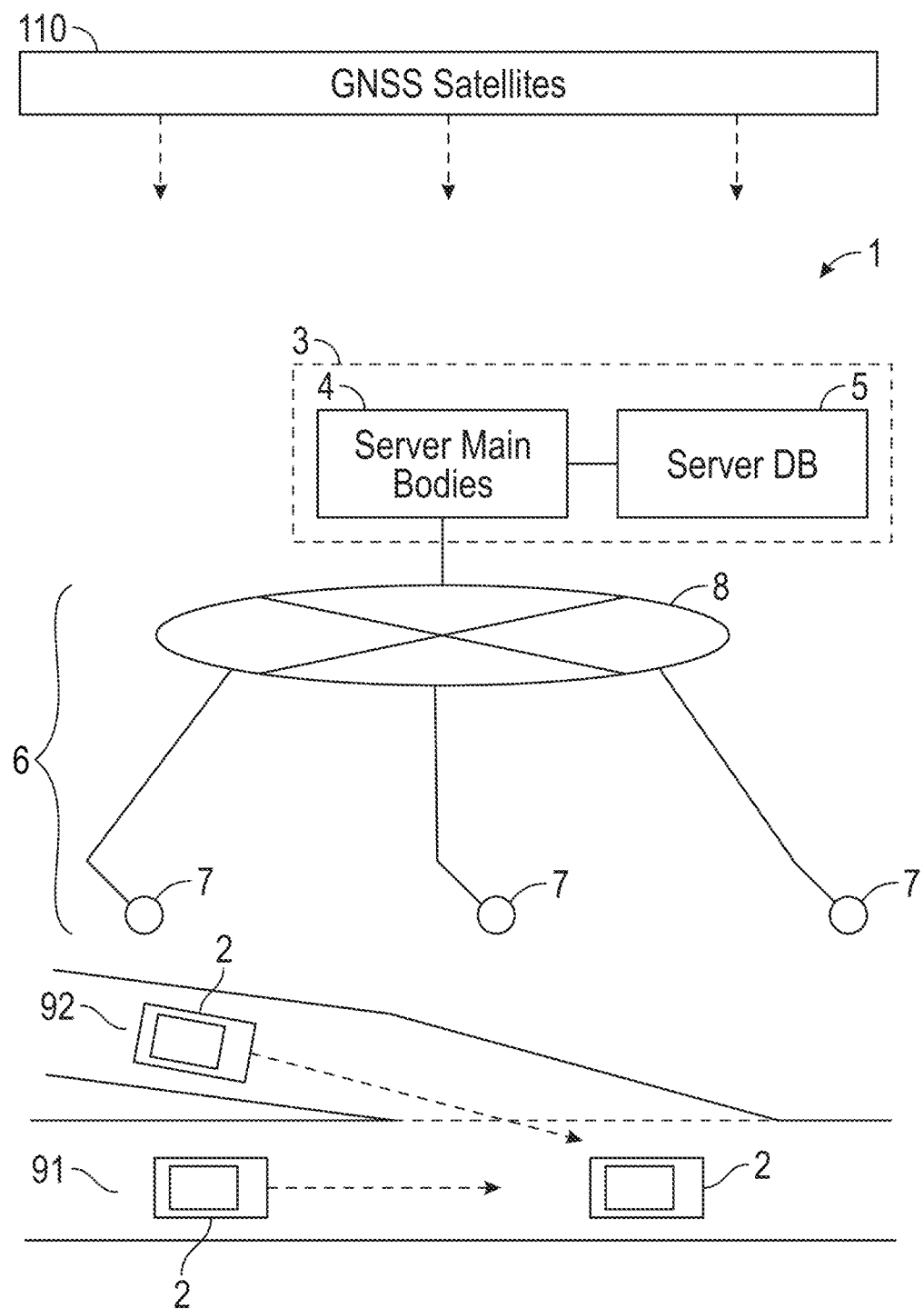
FIG. 1 is a configuration diagram of a control system for automobiles according to an embodiment of the invention.

FIG. 1 is a configuration diagram of a control system 1 for automobiles according to an embodiment of the invention.

The control system 1 in FIG. 1 includes multiple automobiles 2 and a server apparatus 3. The multiple automobiles 2 travel on a road. The server apparatus 3 transmits and receives information to and from the multiple automobiles 2 through a communication system 6.

Here, the automobiles 2 are an example of vehicles. Other examples of the vehicles include trucks, buses, motorcycles, and personal mobilities. In FIG. 1, the multiple automobiles 2 travel around a merging section where a main lane 91 and a merging lane 92 merge.

The communication system 6 includes multiple base stations 7 and a communication network 8. The multiple base stations 7 are arranged along the road. To the communication network 8, the multiple base stations 7 are coupled. The base stations 7 may be, for example, those for commercial 5G or those for an advanced transportation system such as ADAS (Advanced driver-assistance systems). The communication network 8 may include, for example, a carrier communication network that provides the base stations 7 for 5G, or the Internet coupled to the carrier communication network.

The server apparatus 3 includes a server main body 4 and a server DB 5. The server main body 4 is coupled to the communication network 8 of the communication system 6. The server DB 5 is coupled to the server main body 4. Basically, it suffices that the server apparatus 3 is coupled to the Internet of the communication system 6. But the server apparatus 3 may also be coupled to the carrier communication network. Moreover, the server apparatus 3 may include not one server main body 4 but multiple server main bodies 4 configured to carry out a control distributively in cooperation with one another. The multiple server main bodies 4 may be hierarchized, for example. The multiple server main bodies 4 at the lowermost layer in the hierarchy may be provided distributively in the base stations 7 of the carrier communication network or a regional communication network. Such server main bodies 4 provided regionally distributively may be realized by, for example, control devices of the base stations 7 for 5G. Moreover, the server main bodies 4 provided in the base stations 7 for 5G may generate information to be used in a control of the level 2 or the level 3 of the automated driving level with respect to each automobile 2 in the zone.

Moreover, the server apparatus 3 in FIG. 1 carries out a control with respect to the multiple automobiles 2 in a control range constituted by zones of the multiple base stations 7.

Furthermore, FIG. 1 illustrates GNSS (Global Navigation Satellite System) satellites 110. The GNSS satellites 110 broadcast signals including information regarding their positions and the time, to the ground. A GNSS receiver 21 is able to obtain information regarding a position and the time of the GNSS receiver 21 by receiving the signals of the multiple GNSS satellites 110. The position and the time of each GNSS receiver 21 become more probable, and become less likely to have errors with respect to the position and the time of another GNSS receiver 21.

Figure 2:
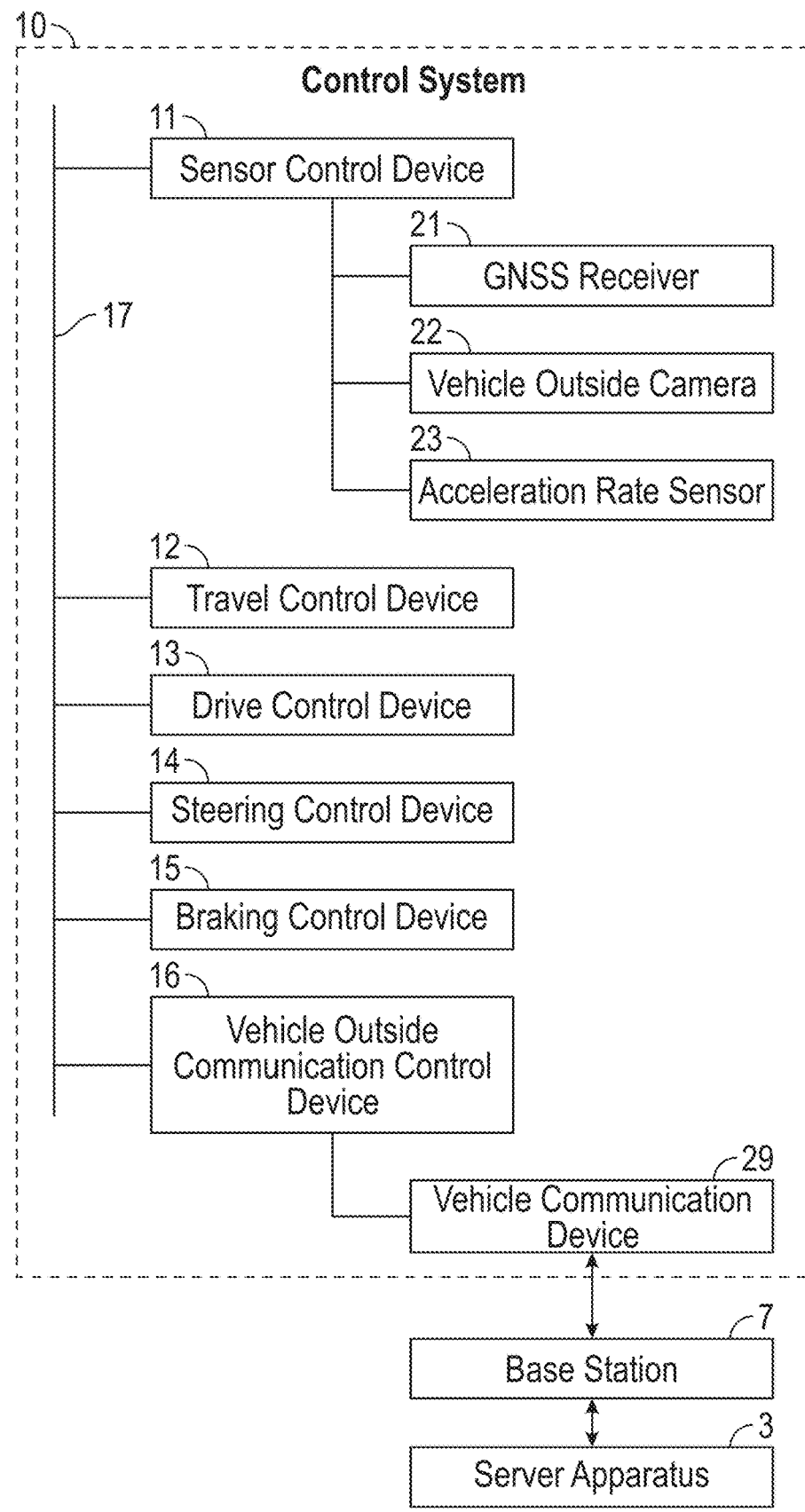
FIG. 2 is an explanatory diagram of a control system of the automobile in FIG. 1.

FIG. 2 is an explanatory diagram of a control system 10 of the automobile 2 in FIG. 1.

Each of the multiple automobiles 2 illustrated in FIG. 1 may include the control system 10 in FIG. 2.

The control system 10 of the automobile 2 in FIG. 2 includes a vehicle network 17 and multiple control devices coupled thereto. FIG. 2 illustrates, as examples of the multiple control devices, a sensor control device 11, a travel control device 12, a drive control device 13, a steering control device 14, a braking control device 15, and a vehicle outside communication control device 16. The control system 10 of the automobile 2 may include, for example, an operation control device or the like as other control devices.

To the operation control device, operation members such as a steering wheel and a pedal are coupled. The operation members are operated by an occupant during manual driving. Moreover, each of the control devices illustrated in FIG. 2 may be coupled to the vehicle network 17.

The vehicle network 17 may be those for vehicles, e.g., the CAN (Controller Area Network) or the LIN (Local Interconnect Network). Moreover, the vehicle network 17 may include a commonly used network such as the IEEE (Institute of Electrical and Electronics Engineers) 802.3 or the IEEE 802.11. By using such a vehicle network 17, it is possible for each of the multiple control devices provided in the automobile 2 to be supplied with information from, and output information to other control devices through the vehicle network 17.

The sensor control device 11 controls operation of various subject-vehicle sensors provided in the automobile 2. The sensor control device 11 outputs detection values by the various subject-vehicle sensors or processed information to other control devices through the vehicle network 17. The processed information is obtained by processing the detection values. The sensor control device 11 may generate the processed information to be used in the control at the level 2 or the level 3 of the automated driving level.

In FIG. 2, to the sensor control device 11, the GNSS receiver 21, a vehicle outside camera 22, and an acceleration rate sensor 23 are coupled, as examples of the subject-vehicle sensors. In addition, to the sensor control device 11, a vehicle speed sensor and a steering sensor and the like may be coupled. The vehicle speed sensor detects a speed of the automobile 2. The steering sensor detects a steering wheel angle of an unillustrated steering wheel of the automobile 2.

The GNSS receiver 21 generates information regarding a position and the time of the automobile 2.

The vehicle outside camera 22 captures an image of the surroundings of the automobile 2 traveling on, for example, a road. The vehicle outside camera 22 may be a monocular camera, a compound-eye camera, or a 360-degree camera. It is desirable that the vehicle outside camera 22 be able to capture at least a frontward view of the traveling automobile 2. The sensor control device 11 may generate information regarding relative distances and directions of other automobiles around the subject vehicle based on the captured image by the vehicle outside camera 22.

The acceleration rate sensor 23 detects an acceleration rate of the automobile 2. By using a sensor that detects an acceleration rate in an axial direction as the acceleration rate sensor 23, it is possible for the sensor control device 11 to generate information regarding angular acceleration rates in yaw, pitch, and roll directions of the automobile 2. Moreover, the sensor control device 11 may generate information regarding the speed of the automobile 2 by time-integrating the acceleration rate by the acceleration rate sensor 23.

To the vehicle outside communication control device 16, a vehicle communication device 29 is coupled. The vehicle communication device 29 is provided in the automobile 2. The vehicle communication device 29 establishes a wireless communication path with the base station 7 with which communication is available. The vehicle outside communication control device 16 controls operation of the vehicle communication device 29, and transmits and receives information to and from the server apparatus 3 through the vehicle communication device 29 and the base station 7. For example, the vehicle outside communication control device 16 outputs information received by the vehicle communication device 29 from the server apparatus 3 or the base station 7, to another control device through the vehicle network 17. The vehicle outside communication control device 16 transmits information inputted from another control device through the vehicle network 17, to the server apparatus 3 through the vehicle communication device 29 and the base station 7.

The driving control device 13 is coupled to members of a drive system provided in the automobile 2, e.g., an engine, a motor, and a transmission. The engine generates a driving force by using, for example, gasoline or hydrogen as fuel. The motor generates a driving force by electric power. The driving control device 13 controls operation of these members of the drive system based on control values acquired through the vehicle network 17.

The steering control device 14 is coupled to, for example, a steering device provided in the automobile 2. The steering control device 14 controls operation of the steering device based on the control value acquired through the vehicle network 17.

The braking control device 15 is coupled to a brake device provided in the automobile 2. The braking control device 15 controls operation of the brake device based on the control value acquired through the vehicle network 17.

The travel control device 12 controls travel of the automobile 2. When the automobile 2 is allowed to travel by automated driving without an operation by the occupant, the travel control device 12 acquires information regarding a travel state of the subject vehicle and information regarding the surroundings of the subject vehicle from the sensor control device 11, and generates the control value corresponding to the information.

For example, in a travel control by autonomous automated driving, when determining that another moving body is approaching ahead of the subject vehicle in the latest captured image by the vehicle outside camera 22, the travel control device 12 generates the control value for deceleration and outputs the control value to the braking control device 15. The braking control device 15 carries out a deceleration control in accordance with the control value. Thus, the automobile 2 decelerates or stops.

Moreover, when determining, based on the latest captured image by the vehicle outside camera 22, that the stopped subject vehicle is ready to start, the travel control device 12 generates the control value for acceleration and outputs the control value to the driving control device 13. The driving control device 13 carries out an acceleration control in accordance with the control value. Thus, the automobile 2 accelerates and starts.

Furthermore, when determining, based on the latest captured image by the vehicle outside camera 22, that the traveling subject vehicle is about to deviate from the lane, the travel control device 12 generates the control value for steering and outputs the control value to the steering control device 14. The steering control device 14 carries out a steering control in accordance with the control value. Thus, a direction of the traveling automobile 2 changes, making it possible for the automobile 2 to travel while keeping the lane on which the automobile 2 is traveling.

In addition, when the travel control device 12 compares the position of the vehicle by the GNSS receiver 21 with high-precision map data and determines that the subject vehicle needs to turn right, turn left, or make a lane change, the travel control device 12 generates the control value for steering and outputs the control value to the steering control device 14. The steering control device 14 carries out the steering control in accordance with the control value. This makes it possible for the automobile 2 to turn right, turn left, or make a lane change.

By these travel controls by the autonomous automated driving, it is possible for the travel control device 12 to control the automobile 2 to autonomously travel based on the detection by the subject-vehicle sensors. It is possible for the automobile 2 to travel by the autonomous automated driving.

Figure 3:
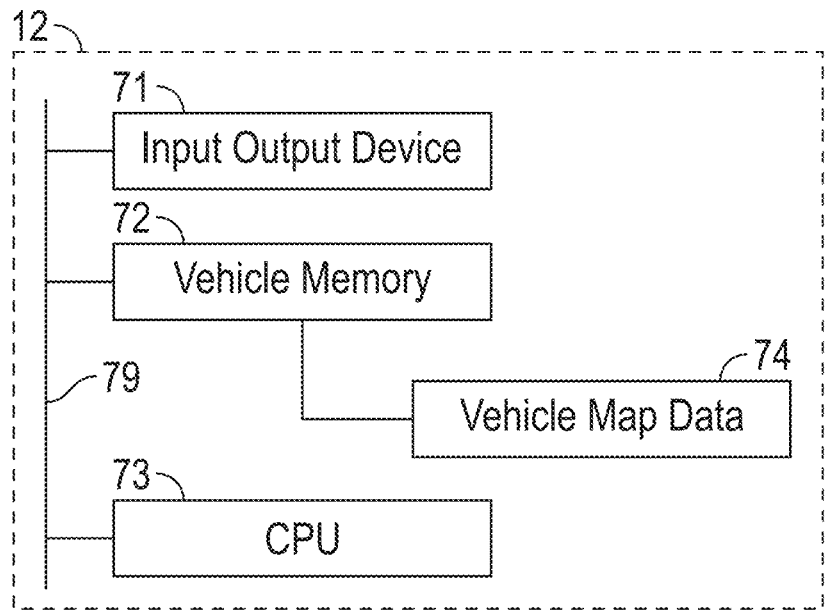
FIG. 3 is a configuration diagram of a travel control device of the automobile in FIG. 2.

FIG. 3 is a configuration diagram of the travel control device 12 of the automobile 2 in FIG. 2.

The travel control device 12 in FIG. 3 includes a vehicle CPU (Central Processing Unit) 73, a vehicle memory 72, an input output device 71, and a vehicle internal bus 79 to which these are coupled. The input output device 71 is coupled to the vehicle network 17. The travel control device 12 may further include, for example, a timer that measures time and the time.

The vehicle memory 72 may include, for example, a semiconductor memory. The vehicle memory 72 holds data such as programs, setting values, and vehicle map data 74 that are used in the control by the travel control device 12. The vehicle map data 74 may be downloaded from the server apparatus 3.

The vehicle CPU 73 reads and executes the programs held in the vehicle memory 72. Thus, a controller of the travel control device 12 is realized. The controller of the travel control device 12 may carry out the travel control by the autonomous automated driving described above.

Figure 4:
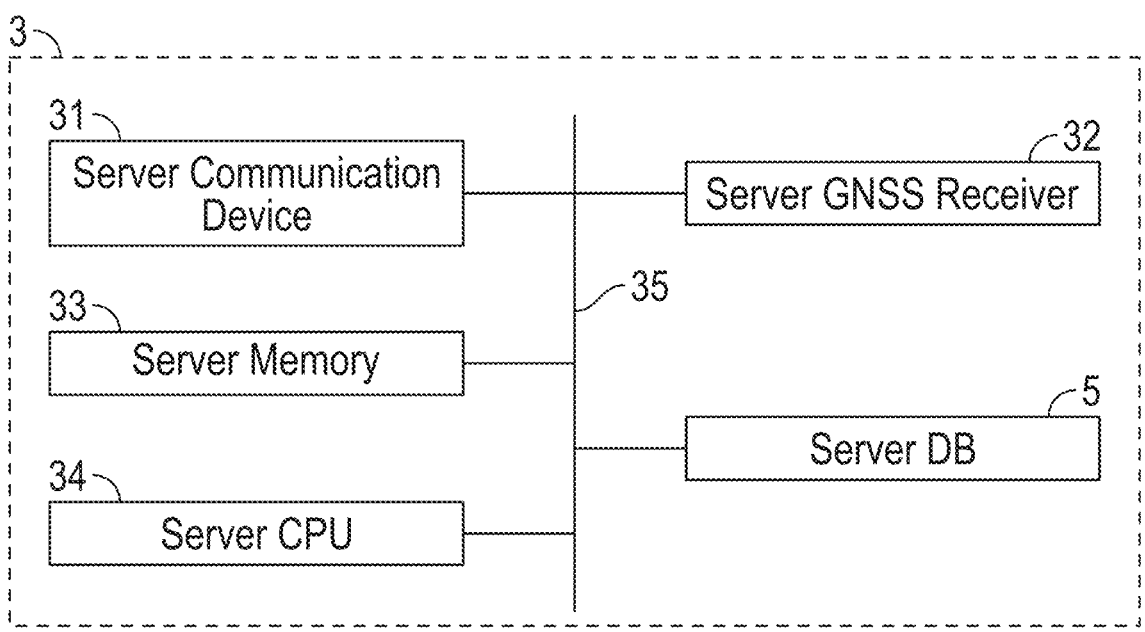
FIG. 4 is a configuration diagram of a server apparatus in FIG. 1.

FIG. 4 is a configuration diagram of the server apparatus 3 in FIG. 1.

The server apparatus 3 in FIG. 4 includes a server communication device 31, a server GNSS receiver 32, the server DB (database) 5, a server memory 33, a server CPU 34, and a server internal bus 35 to which these are coupled.

The server communication device 31 is coupled to the communication network 8 of the communication system 6. The server communication device 31 carries out transmission and receipt of information to and from the vehicle communication device 29 provided in the automobile 2. The server communication device 31 may receive travel information from each of the multiple automobiles 2.

The server GNSS receiver 32 generates information regarding a position and the time of the server apparatus 3. The time generated by the server GNSS receiver 32 may be highly accurately identical with the time generated by the GNSS receiver 21 of each automobile 2.

The server DB 5 accumulates and holds various kinds of data to be used by the server apparatus 3 for the control of the multiple automobiles 2. The server DB 5 may include, for example, server map data 51 and a vehicle position behavior DB (vehicle position behavior database) 53 and the like, as described later. The vehicle position behavior DB 53 accumulates and holds the travel information regarding each of the multiple automobiles 2.

The server memory 33 holds data such as programs to be executed by the server CPU 34, settings values, and the like.

The server CPU 34 reads and executes the programs held in the server memory 33. Thus, in the server apparatus 3, a controller that controls operation of the server apparatus 3 is realized. In the server apparatus 3, as functions of the controller, for example, a pre-processor 41 and a controller 42 described later may be realized.

Now, when making the control of the travel of the multiple automobiles 2 by using such a server apparatus 3, the server apparatus 3 basically has to collect the travel information regarding the multiple automobiles 2, determine, for example, interference between the automobiles 2 based on the travel information, generate individual control information regarding each automobile 2, and individually transmit the individual control information to each automobile 2. The server apparatus 3 makes the control of the travel of each automobile 2 by using information unacquirable in a field of view of each automobile 2. This conceivably leads to enhanced safety and smoothness of the travel of each automobile 2, as compared to a travel control in the field of view of each automobile.

However, in the control by using such a server apparatus 3, what is desired is to maintain a constantly optimal communication state between the server apparatus 3 and each automobile 2.

Meanwhile, for example, each automobile 2 moving by traveling has to establish a wireless communication path with the base station 7 provided along a road, etc., and transmit and receive information to and from the server apparatus 3 by using the wireless communication path.

Moreover, information for other purposes is sometimes transmitted and received through the communication network 8 between the server apparatus 3 and the base station 7 although a degree varies depending on, for example, a position of installation of the server apparatus 3 with respect to the base station 7.

It is not possible to disaffirm that these uncertainties, etc. in the communication system 6 may cause occurrence of, if not constant interruption, temporary interruption of the communication between the server apparatus 3 and each automobile 2.

Moreover, in case of the occurrence of such a failure in the communication state, when the automobile 2 is traveling in a section in which interference with other automobiles easily occurs, e.g., the merging section, the automobile 2 is prevented from being under continuous control of the server apparatus 3. This conceivably causes a concern about the travel of the automobile 2.

As described, as for the control system 1 for automobiles, even in case of occurrence of temporary interruption of the communication between the automobile 2 traveling in the merging section and the server apparatus 3, it is desired to keep the travel of the automobile 2 in the merging section in a control state under control, and to suppress a concern about the travel in the merging section.

Figure 5:
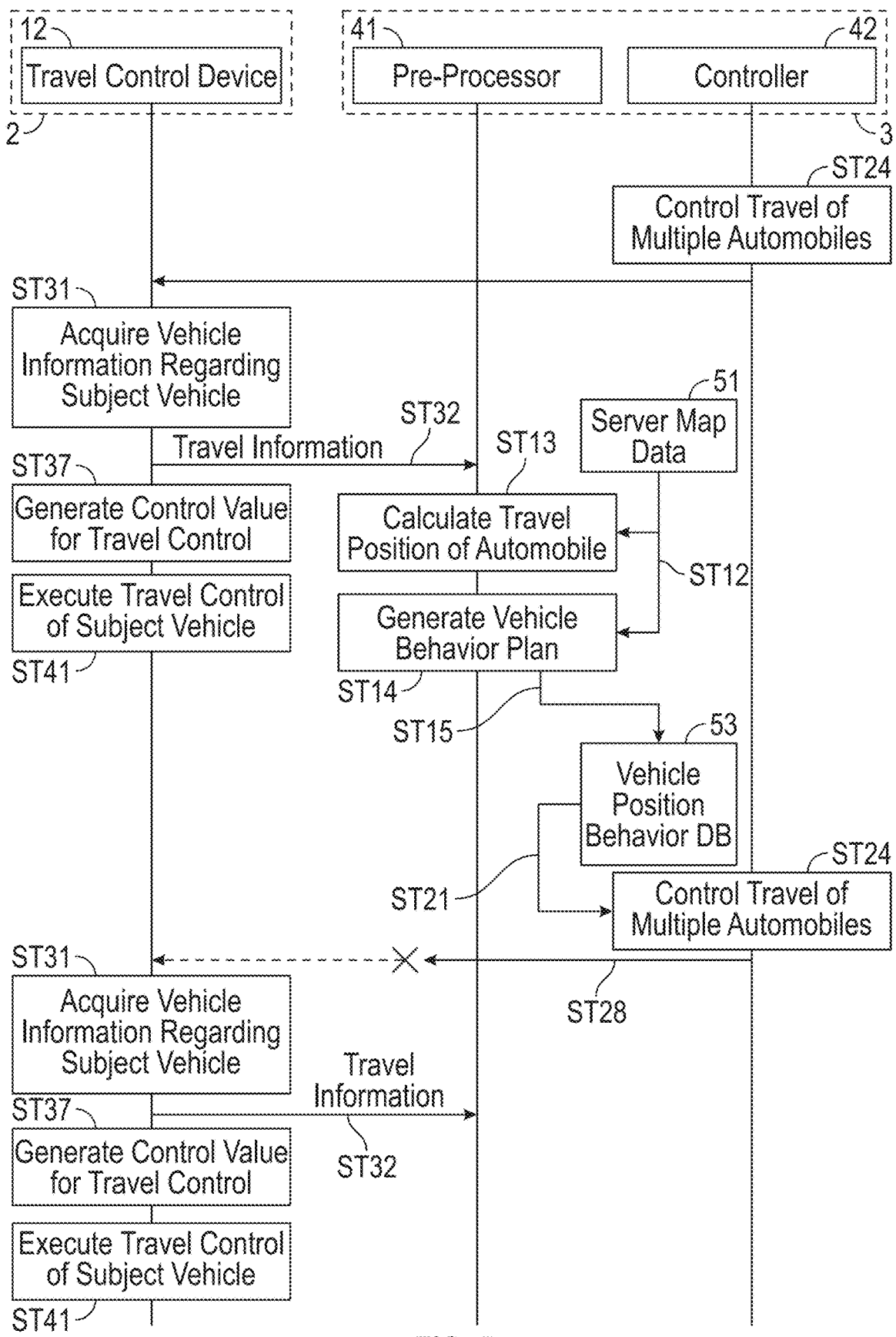
FIG. 5 is a timing chart of an entirety of a control to individually control travel of multiple automobiles, in the control system in FIG. 1.

FIG. 5 is a timing chart of the entire control that includes individually controlling the travel of the multiple automobiles 2, in the control system in FIG. 1. It is to be noted that FIG. 5 illustrates only one automobile 2 in relation to the figure.

FIG. 5 illustrates the travel control device 12 provided in the automobile 2, the pre-processor 41 and the controller 42 realized in the server apparatus 3. Time flows from top to bottom.

Moreover, FIG. 5 illustrates the server map data 51 and the vehicle position behavior DB 53 as the server DB 5 of the server apparatus 3. These may be held in the server DB 5 of the server apparatus 3.

Here, step numbers of respective processes in FIG. 5 correspond to those in FIGS. 6 to 8 described later.

The server map data 51 may be that regarding roads on which the automobile 2 can travel. Generally, the server map data 51 may be high-precision map data including, for example, information regarding each lane of the roads, and detailed information regarding intersections. For example, FIG. 1 illustrates a road in the merging section where the main line 91 and the merging lane 92 merge. As for such a road in the merging section, the server map data 51 may include information regarding a main lane segment S1 and information regarding a merging lane segment S2, as described later with reference to FIG. 10. The main lane segment S1 indicates a position on the main line 91. The merging lane segment S2 indicates a position on the merging lane 92. As described above, by using the server map data 51 including detailed information regarding the roads, it is possible for the server apparatus 3 to identify not only the road on which each automobile 2 is traveling but also the lane on which each automobile 2 is traveling and a position on the lane, with respect to, for example, the multiple automobiles 2 traveling on the road.

The pre-processor 41 carries out a pre-processing control when the server communication device 31 receives a new piece of the travel information. The pre-processor 41 reads the server map data 51 (step ST12), calculates at least a travel position of the automobile 2 related to the traveling information (step ST13), generates a vehicle behavior plan based on, for example, the travel position (step ST14), and records these pieces of information in the vehicle position behavior DB 53 (step ST15).

Thus, the vehicle position behavior DB 53 basically holds positions and behavior of the multiple automobiles 2 traveling in a region controlled by the server apparatus 3. It is desirable that the vehicle position behavior DB 53 hold information regarding, for example, the positions of all the automobiles 2 under the control of the server apparatus 3, including those regarding which no individual control information is to be generated. For example, an intersection camera for the ADAS is able to capture an image of basically all the automobiles 2 passing through an intersection. Based on such information, the vehicle position behavior DB 53 may hold, for example, the positions of all the automobiles 2 under the control of the server apparatus 3. Thus, the vehicle position behavior DB 53 accumulates and holds the travel information regarding all the automobiles 2 under the control of the server apparatus 3. Moreover, in the vehicle position behavior DB 53, the travel information regarding the multiple automobiles 2 may be associated with identification information issued for each automobile 2.

The controller 42 reads the information held in the vehicle position behavior DB 53 and carries out the control that includes making the control of the travel of the multiple automobiles 2 (step ST24). In the control, the controller 42 basically periodically generates the individual control information regarding each of the multiple automobiles 2 under the control, and transmits the individual control information to each automobile 2. The individual control information differs from the automobile 2 to the automobile 2. The vehicle communication device 29 of each automobile 2 receives the individual control information for the subject vehicle from the server apparatus 3.

In such a control system, basically, the server apparatus 3 is able to repetitively generate multiple pieces of the individual control information to control the travel of the multiple automobiles 2 traveling under the control, by a control by the pre-processor 41 and the controller 42. Moreover, in the automobile 2 that receives the individual control information, the travel control device 12 of the automobile 2 is able to generate the control value following a request in the individual control information, by using the individual control information received from the server apparatus 3, and control the travel of the subject vehicle by the automated driving. The multiple automobiles 2 carry out the travel control basically following the control of the server apparatus 3, under the control of the server apparatus 3. This makes it possible for the multiple automobiles 2 to safely travel without causing interference with one another.

For example, in step ST31, the travel control device 12 of the automobile 2 acquires the vehicle information regarding the subject vehicle. In step ST32, the travel control device 12 transmits the vehicle information to the server apparatus 3 as the travel information regarding the subject vehicle. Moreover, in step ST37, the travel control device 12 generates the control value for the travel control by using the vehicle information regarding the subject vehicle acquired by receipt from the server apparatus 3. In step ST41, the travel control device 12 carries out the travel control of the subject vehicle. The travel control device 12 of the automobile 2 periodically carries out such an autonomous travel control, as illustrated in FIG. 5 in which steps ST31 to ST41 are repeated. Thus, it is possible for the travel control device 12 of the automobile 2 to check the latest travel state of the subject vehicle and keep on controlling the travel of the subject vehicle to cope with each travel state.

In the server apparatus 3, upon receiving a new piece of the travel information from each automobile 2, in step ST13, the pre-processor 41 calculates a position on the lane (hereinafter, referred to as a vehicle S-position) of the automobile 2. Moreover, in step ST12, the pre-processor 41 reads the server map data 51. In step ST14, the pre-processor 41 generates an automobile-2 behavior plan for the automobile 2 in accordance with, for example, a road shape. In step ST15, the pre-processor 41 records information such as the automobile-2 behavior plan generated, in the vehicle position behavior DB 53. The pre-processor 41 repeats the processes in steps ST12 to ST15 every time a new piece of the travel information is received from each automobile 2. Thus, the vehicle position behavior DB 53 holds the automobile-2 behavior plan corresponding to the latest travel state of each of the multiple automobiles 2. Here, the automobile-2 behavior plan may include information such as acceleration, speed keeping, deceleration, a stop, a speed range (an upper limit and a lower limit), lane keeping, or a lane change of each automobile 2.

Moreover, in the server apparatus 3, in step ST21, the controller 42 periodically reads information from the vehicle position behavior DB 53. While determining, for example, the interference of each automobile 2, in step ST24, the controller 42 generates the individual control information corresponding to the interference. In step ST28, the controller 42 individually transmits the individual control information to each automobile 2. In this case, the travel control device 12 of the automobile 2 is able to control the travel of the subject vehicle by generating the control value to allow the subject vehicle to travel basically following the individual control information, by using the latest individual control information acquired from the server apparatus 3 together with the vehicle information regarding the subject vehicle acquired in step ST31.

It is to be noted that, even after the automobile 2 controls the travel of the subject vehicle basically following the individual control information, there is possibility that the travel state of the automobile 2 is short of optimal suppression of, for example, the interference. In such a case, the server apparatus 3 generates and transmits the next piece of the individual control information including a similar request to the previous one. By repeating the travel control following the individual control information including the similar request, the travel of the automobile 2 is expected to approach the travel state following a determination result as to the interference or the like in the server apparatus 3, and travel in the relevant travel state.

As described, when the individual control information addressed to the subject vehicle is received from the server apparatus 3, the travel control device 12 of each of the multiple automobiles 2 repetitively generates the control value for the travel control of the subject vehicle by using the received individual control information addressed to the subject vehicle, making it possible to control the travel of the subject vehicle under the control of the server apparatus 3.

Figure 6:
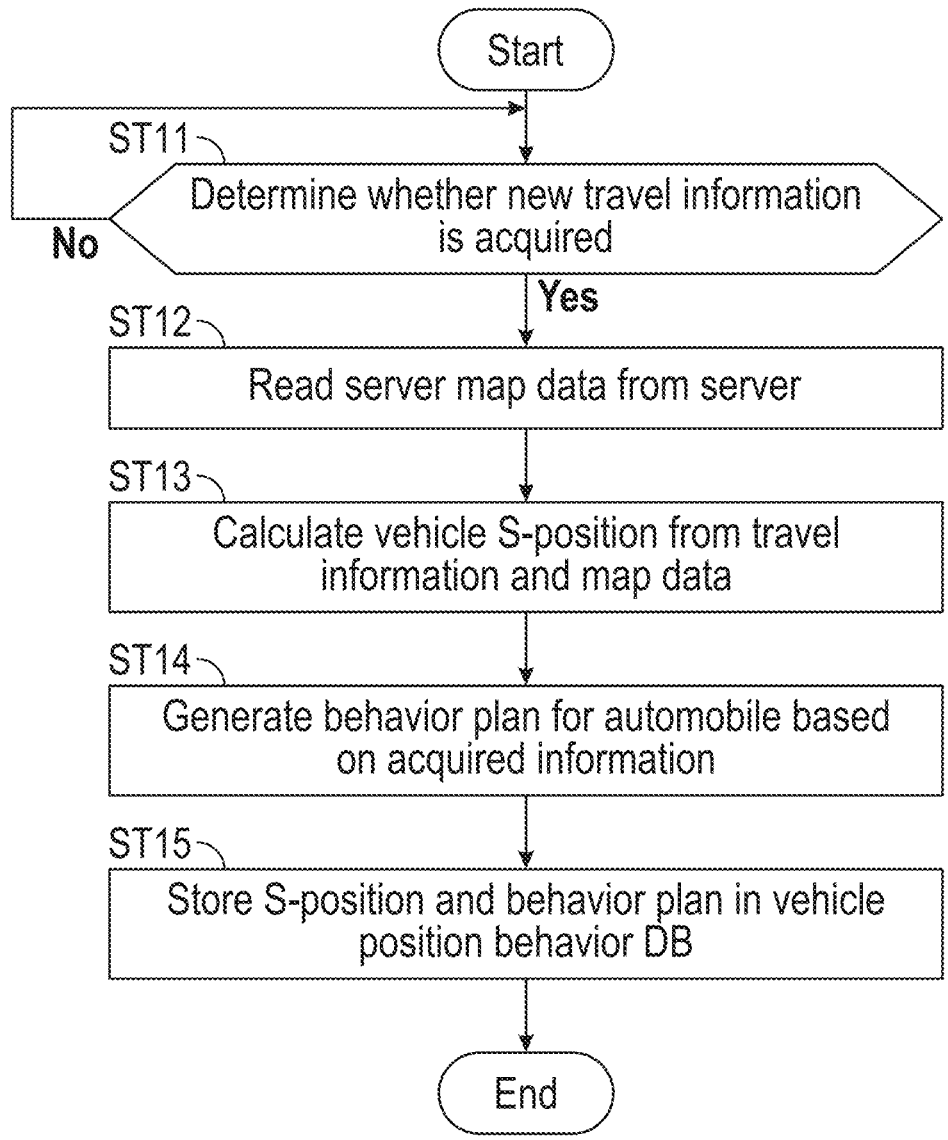
FIG. 6 is a flowchart of a pre-processing control, by a server CPU in FIG. 4.

FIG. 6 is a flowchart of the pre-processing control by the server CPU 34 in FIG. 4.

The server CPU 34 repetitively carries out the pre-processing control in FIG. 6 as the processing by the pre-processor 41.

In step ST11, the pre-processor 41 determines whether or not a new piece of the travel information has been received and acquired by the server communication device 31. When no new piece of the travel information has been acquired, the pre-processor 41 repeats this process. Upon acquiring a new piece of the travel information, the pre-processor 41 causes the flow to proceed to step ST12.

In step ST12, the pre-processor 41 reads the server map data 51 from the server DB 5.

In step ST13, the pre-processor 41 calculates the vehicle S-position, based on positional information regarding the automobile 2 included in the newly received piece of the traveling information and the server map data 51. The vehicle S-position indicates the lane on which the automobile 2 related to the travel information is traveling, and the position on the lane.

In step ST14, the pre-processor 41 generates the automobile-2 behavior plan for the automobile 2 from which the new piece of the travel information has been received, by using the information acquired in the processes by step ST13.

The pre-processor 41 generates the automobile-2 behavior plan indicating a travel schedule of the automobile 2, basically based on, for example, the vehicle S-position and a route of the automobile 2 from which the new piece of the travel information has been received.

The automobile-2 behavior plan may include, for example, information regarding acceleration of the automobile 2, information regarding speed keeping, information regarding deceleration, information regarding a stop, information regarding the speed range (the upper limit and the lower limit), information regarding lane keeping, information regarding a lane change, and the like.

In step ST15, the pre-processor 41 records the information generated in the processes by step ST13, in the vehicle position behavior DB 53, and updates the vehicle position behavior DB 53. Thereafter, the pre-processor 41 ends the current control.

Figure 7:
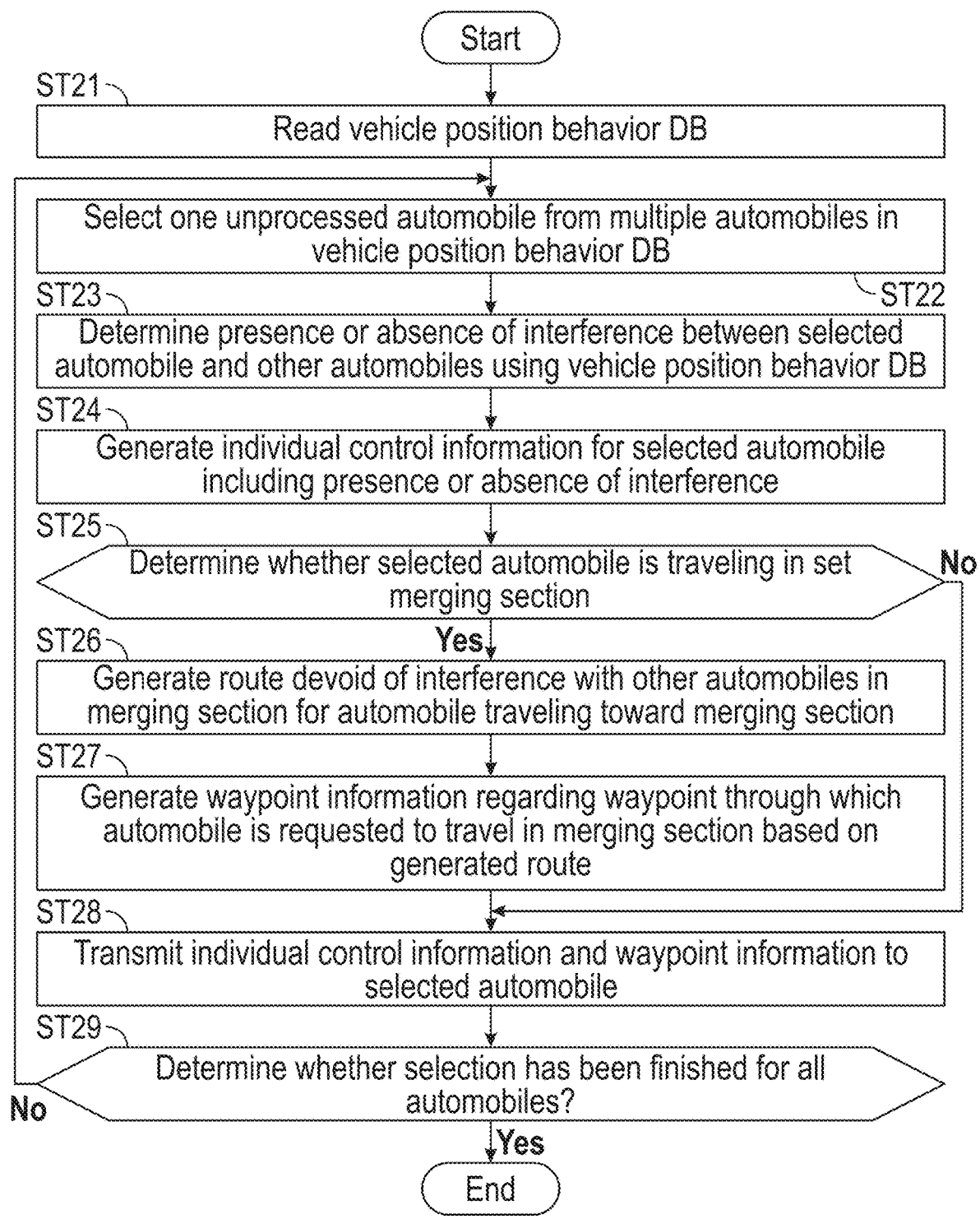
FIG. 7 is a flowchart of the control, by the server CPU in FIG. 4.

FIG. 7 is a flowchart of the control by the server CPU 34 in FIG. 4.

The server CPU 34 periodically carries out the control in FIG. 7 as processing by the controller 42. This makes it possible for the server CPU 34 to continue to periodically generate the individual control information and transmit the individual control information to the multiple automobiles 2 under the control.

In step ST21, the controller 42 reads the vehicle position behavior DB 53.

In step ST22, the controller 42 selects one unprocessed automobile 2 from among the multiple automobiles 2 regarding which the information is held in the vehicle position behavior DB 53.

In step ST23, the controller 42 determines presence or absence of the interference of the automobile 2 selected in step ST22 with other automobiles, by using the information held in the vehicle position behavior DB 53.

Here, the interference may include not only that the position of the selected automobile 2 overlaps a position of another automobile, but also that an inter-vehicle distance becomes equal to or smaller than a threshold value. For example, as for a following automobile 2 moving at a higher speed than a preceding automobile 2, there is possibility that the inter-vehicle distance from the following automobile 2 to the preceding automobile 2 becomes equal to or smaller than the threshold value depending on a speed difference. The controller 42 may determine that the interference is present, based on, for example, the inter-vehicle distance becoming equal to or smaller than the threshold value as mentioned above.

In step ST24, the controller 42 generates the individual control information including the presence or absence of the interference, with respect to the automobile 2 selected in step ST22.

For example, when it is determined that the interference with the preceding automobile 2 is present as mentioned above, the controller 42 may generate the individual control information including a request for speed keeping or deceleration, even if the vehicle position behavior DB 53 holds information regarding, for example, acceleration or speed keeping.

In contrast, when it is determined that there is no interference with other automobiles, the controller 42 may adopt the information held in the vehicle position behavior DB 53 as it is, to generate the individual control information.

As described, the controller 42 generates the individual control information including the determination result as to the presence or absence of the interference or the information corresponding thereto, as the individual control information regarding each automobile 2 under the control. The controller 42 generates not the control value to be used in the travel control in each automobile 2, but the information indicating a request with respect to the travel of each automobile 2. The individual control information may include the determination result as to the presence or absence of the interference, and the information including a request for acceleration, speed keeping, deceleration, a stop, the speed range (the upper limit and the lower limit), lane keeping, or a lane change.

In step ST25, the controller 42 determines whether or not the automobile 2 selected in step ST22 is traveling in a set merging section R3 to be used in the control.

Here, the set merging section R3 may include not only the merging section R1 on the road but also a pre-merger section R2 short of the merging section R1. The merging section R1 is a section where the automobile 2 is permitted to make a lane change between the main line 91 and the merging lane 92 illustrated in FIGS. 1 and 9. This makes it possible for the controller 42 to carry out the control for merging in advance, not only with respect to the automobile 2 traveling in the merging section R1 on the road but also with respect to the automobile 2 traveling toward the merging section R1 on the road.

Moreover, when the automobile 2 selected in step ST22 is traveling in the set merging section R3, the controller 42 causes the flow to proceed to step ST26. When the automobile 2 selected in step ST22 is not traveling in the set merging section R3, the controller 42 causes the flow to proceed to step ST28.

In step ST26, the controller 42 generates a route devoid of the interference with other automobiles in the merging section, with respect to the automobile 2 traveling toward the merging section. Details are described later.

In step ST27, the controller 42 generates waypoint information regarding a waypoint through which each automobile 2 is requested to travel in the merging section, with respect to the route generated in step ST26.

Here, the controller 42 may select at least two points, with respect to the route generated in step ST26, and generate information regarding positions of the respective points and the passage time, as the waypoint information. Moreover, the at least two points may be, for example, points closer to an end point of the merging section than the current position of the automobile 2 traveling toward the merging section. Details are described later.

In step ST28, the controller 42 individually transmits, to the automobile 2 selected in step ST22, the information generated by step ST27 with respect to the automobile 2 selected in step ST22. In this case, the waypoint information is individually transmitted to the automobile 2 selected in step ST22 together with the individual control information generated in step ST24. The individual control information regarding each automobile 2 traveling toward the merging section includes the determination result as to the interference.

In step ST29, the controller 42 determines whether or not the selection in step ST22 for all the automobiles 2 under the control has been finished. For example, the controller 42 may determine whether or not the selection in step ST22 has been finished for all the automobiles 2 in the vehicle position behavior DB 53. When the selection of all the automobiles 2 has not been finished, the controller 42 causes the flow to return to step ST22. The controller 42 repeats the processes from step ST22 to step ST29 until the selection of all the automobiles 2 have been finished. Thus, all the automobiles 2 under the control are supplied with the respective pieces of the individual control information. Moreover, the multiple automobiles 2 traveling in the set merging section are supplied with the respective pieces of the waypoint information.

Figure 8:
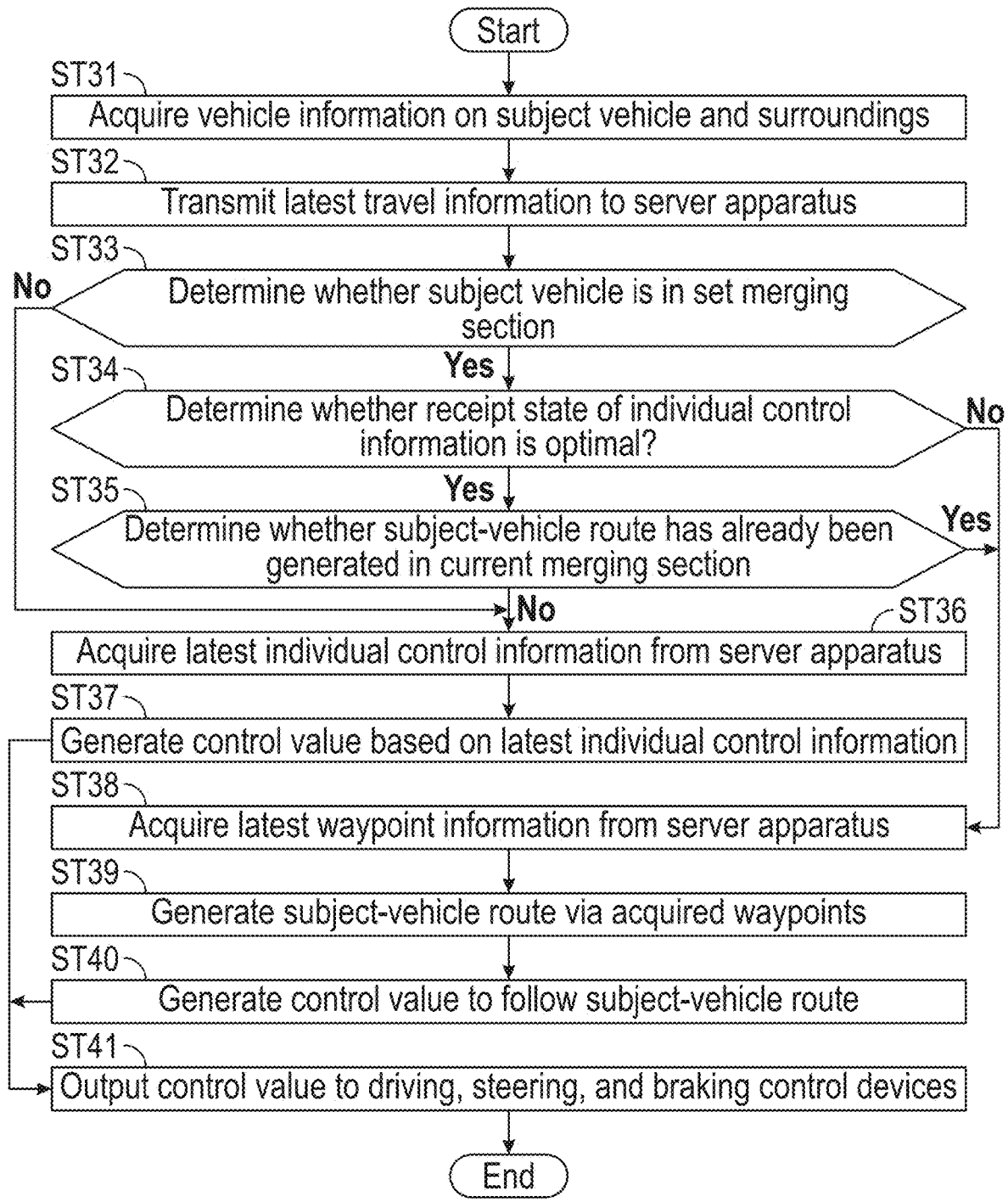
FIG. 8 is a flowchart of a travel control under the control, by the travel control device of the automobile in FIG. 3.

FIG. 8 is a flowchart of the travel control under the control, by the travel control device 12 of the automobile 2 in FIG. 3.

The travel control device 12 of each of the multiple automobiles 2 traveling under the control of the server apparatus 3 repetitively carries out the travel control under the control in FIG. 8.

When the travel control device 12 is carrying out the travel control under the control of the server apparatus 3, the vehicle communication device 29 of the relevant automobile 2 is normally able to periodically receive the individual control information from the server apparatus 3. The vehicle outside communication control device 16 outputs the individual control information periodically received by the vehicle communication device 29 to the travel control device 12 through the vehicle network 17. The travel control device 12 may accumulate and record the individual control information in the vehicle memory 72.

In step ST31, the travel control device 12 collects and acquires the vehicle information such as the information indicating the travel state of the subject vehicle and the information regarding travel environment around the subject vehicle from, for example, the sensor control device 11 of the subject vehicle. It is to be noted that the information to be acquired from, for example, the sensor control device 11 of the subject vehicle may be acquired in advance and held in, for example, the vehicle memory 72 of the travel control device 12. Here, the vehicle information may include information regarding, for example, positions, directions, speeds, acceleration rates, and directions of travel of the subject vehicle and other vehicles around the subject vehicle included in, for example, the captured image by the invehicle camera. The travel control device 12 may process the information acquired from, for example, the sensor control device 11 to generate these pieces of information. Moreover, the vehicle information may include, for example, information indicating operation states, control contents, and control results of, for example, the driving control device 13, the steering control device 14, and the braking control device 15. Moreover, the vehicle information may include information regarding the time generated by the GNSS receiver 21.

In step ST32, the travel control device 12 transmits the latest travel information based on the vehicle information acquired in step ST31 to the server apparatus 3 by using the vehicle outside communication control device 16. The vehicle outside communication control device 16 transmits the travel information inputted from the travel control device 12, to the server apparatus 3 through the vehicle communication device 29 and the base station 7. Here, it suffices that the travel information is any information to be used by the server apparatus 3 in the control. The travel information may be the vehicle information as it is, or may be a portion of the vehicle information. For the control, the server apparatus 3 needs information regarding the position of each automobile 2 as minimum information regarding each automobile 2.

In step ST33, the travel control device 12 determines whether or not the subject vehicle is traveling in the set merging section R3. The travel control device 12 may compare the current position of the subject vehicle with the vehicle map data 74 to determine whether or not the subject vehicle is traveling in the set merging section R3. Thus, when the subject vehicle is traveling in the merging section R1 on the road, or when the subject vehicle is traveling toward the merging section R1, the travel control device 12 determines that the subject vehicle is traveling in the set merging section R3, and causes the flow to proceed to step ST34. When the travel control device 12 does not determine that the subject vehicle is traveling in the set merging section R3, the travel control device 12 causes the flow to proceed to step ST36.

In step ST34, the travel control device 12 determines whether or not a state of receipt of the individual control information by the vehicle communication device 29 from the server apparatus 3 is optimal. For example, the travel control device 12 may determine whether or not the state of receipt of the individual control information from the server apparatus 3 is optimal, based on, for example, comparison between elapsed time since previous receipt of the individual control information and a cycle of the receipt, and magnitude of an error of an interval of the receipt of the individual control information, with reference to the cycle of the receipt. For example, when the communication with the server apparatus 3 is interrupted, the elapsed time and the interval of the receipt become longer. Moreover, for example, when a difference between the elapsed time and the cycle of the receipt is equal to or smaller than a threshold value, or when the error of the interval of the receipt is equal to or smaller than a threshold value, the travel control device 12 determines that the state of receipt of the individual control information from the server apparatus 3 is optimal, and causes the flow to proceed to step ST35. In contrast, when the state of receipt is not optimal, the travel control device 12 causes the flow to proceed to step ST38. This makes it possible for the travel control device 12 to carry out the processing in accordance with the communication state of the server apparatus 3 when the subject vehicle is traveling toward the merging section R1 on the road or when the subject vehicle is traveling in the merging section.

In step ST35, the travel control device 12 determines whether or not a subject-vehicle route has been generated in step ST39 described later. When the subject-vehicle route has already been generated while the subject vehicle is traveling in the current set merging section R3, the travel control device 12 causes the flow to proceed to step ST38. When the subject-vehicle route has not been generated, the travel control device 12 causes the flow to proceed to step ST36.

In step ST36, the travel control device 12 acquires the latest individual control information acquired from the server apparatus 3.

In step ST37, the travel control device 12 generates the control value to control the travel of the subject vehicle, based on the information acquired by step ST36.

In this case, the travel control device 12 has acquired the latest individual control information in step ST36. The travel control device 12 basically follows the received individual control information addressed to the subject vehicle, and generates the control value for the travel control of the subject vehicle, to correspond to the vehicle information in the field of view of the subject vehicle as well.

The travel control device 12 generates, for example, the control value that causes acceleration of the automobile 2, the control value that causes speed keeping, the control value that causes deceleration, the control value that causes a stop, the control value that causes speed keeping in the speed range (the upper limit and the lower limit), the control value that causes steering for lane keeping, and the control value that causes steering for a lane change.

In this way, when the travel control device 12 is in a state where the individual control information is optimally received from the server apparatus 3, it is possible for the travel control device 12 to generate the control value that makes it possible to suppress the interference under the control, by using the latest individual control information to suppress the interference.

In contrast, when the individual control information addressed to the subject vehicle is not received from the server apparatus 3, the travel control device 12 ends up in generating the control value for the travel control of the subject vehicle, to cope with the interference that can be determined based on the vehicle information in the field of view of the subject vehicle.

Thereafter, the travel control device 12 causes the flow to proceed to step ST41.

In step ST38, the travel control device 12 acquires the latest waypoint information acquired from the server apparatus 3 that carries out the control.

In step ST39, the travel control device 12 generates the subject-vehicle route to allow the subject vehicle to pass by the waypoints acquired in step ST38 under the condition in the waypoint information. Details are described later.

As described, when the travel control device 12 is in the state where the individual control information is not optimally received from the server apparatus 3, it is possible for the travel control device 12 to generate the control value that allows the subject vehicle to travel to pass by the waypoints, by using the waypoint information that has been received last in the optimal communication state, without using the latest individual control information. Even in a state in which, for example, the communication with the server apparatus 3 is interrupted, it is possible for the travel control device 12 to generate the control value based on the latest waypoint information acquired from the server apparatus 3 that carries out the control.

In step ST40, the travel control device 12 generates the control value to allow the subject vehicle to travel following the subject-vehicle route generated in step ST39.

Thereafter, the travel control device 12 causes the flow to proceed to step ST41.

In step ST41, the travel control device 12 outputs the control value generated in step ST37 or ST40 to each of the control devices that carry out the travel control of the subject vehicle through the vehicle network 17. Thus, for example, the driving control device 13 carries out a control to bring a driving output to the control value. The steering control device 14 carries out a control to bring the steering angle including a direction of steering to the control value. The braking control device 15 carries out a control to bring a braking force to the control value. The travel of the automobile 2 is controlled under the control of the server apparatus 3.

Thereafter, the travel control device 12 ends the current control.

For example, it is possible for the automobile 2 to travel under the control of the server apparatus 3 by continuously generating the control value based on the latest control information acquired from the server apparatus 3 that carries out the control.

Moreover, it is possible for the automobile 2 to generate the control value based on the waypoint information received in advance from the server apparatus 3 even when the latest control information is unreceivable and unacquirable from the server apparatus 3 that carries out the control. Even when the latest control information is unacquirable from the server apparatus 3 that carries out the control, the automobile 2 travels along the route assumed by the server apparatus 3 as the travel of the automobile 2 in the merging section. The travel of the automobile 2 is controlled under the control of the server apparatus 3 even when the latest control information is unacquirable from the server apparatus 3 that carries out the control.

Furthermore, the travel control device 12 of the automobile 2 carries out the determination process in step ST35. Thus, even when the state of receipt of the individual control information from the server apparatus 3 is restored from a non-optimal one to an optimal one after generating the subject-vehicle route in the set merging section R3, the travel control device 12 generates the control value to allow the subject vehicle to travel following the subject-vehicle route until the subject vehicle passes through the set merging section R3 or until the subject vehicle passes by the end point of the merging section received from the server apparatus 3. When the travel control of the automobile 2 traveling in the merging section frequently switches between the control based on the individual control information and the control based on the waypoint information in the middle of, for example, the merging section, there is possibility that an unexpected state may occur in the behavior of the automobile 2 as a result. Even if the control is switched under the control, it is conceivably difficult to prevent fluctuation of the travel control because of repetitive switching of the control.

Moreover, as in the present embodiment, after passing through the merging section, the travel control of each automobile 2 is restored from the control based on the waypoint information to the control based on the individual control information. This makes it possible to prevent occurrence of such unexpected behavior of the automobile 2 while merging. It is possible for the multiple automobiles 2 traveling in the merging section based on the waypoint information under the control of the server apparatus 3 to control the travel of the respective automobiles in preestablished harmony based on respective pieces of the waypoint information. Furthermore, it is possibly unnecessary for each automobile 2 to control its travel to cope with the unexpected behavior of each automobile 2 while traveling through the merging section. Even when the communication state with the server apparatus 3 becomes non-optimal, it is possible for the multiple automobiles 2 traveling in the merging section to pass through the merging section while ensuring a certain level of safety by the travel in the preestablished harmony.

Figure 9:
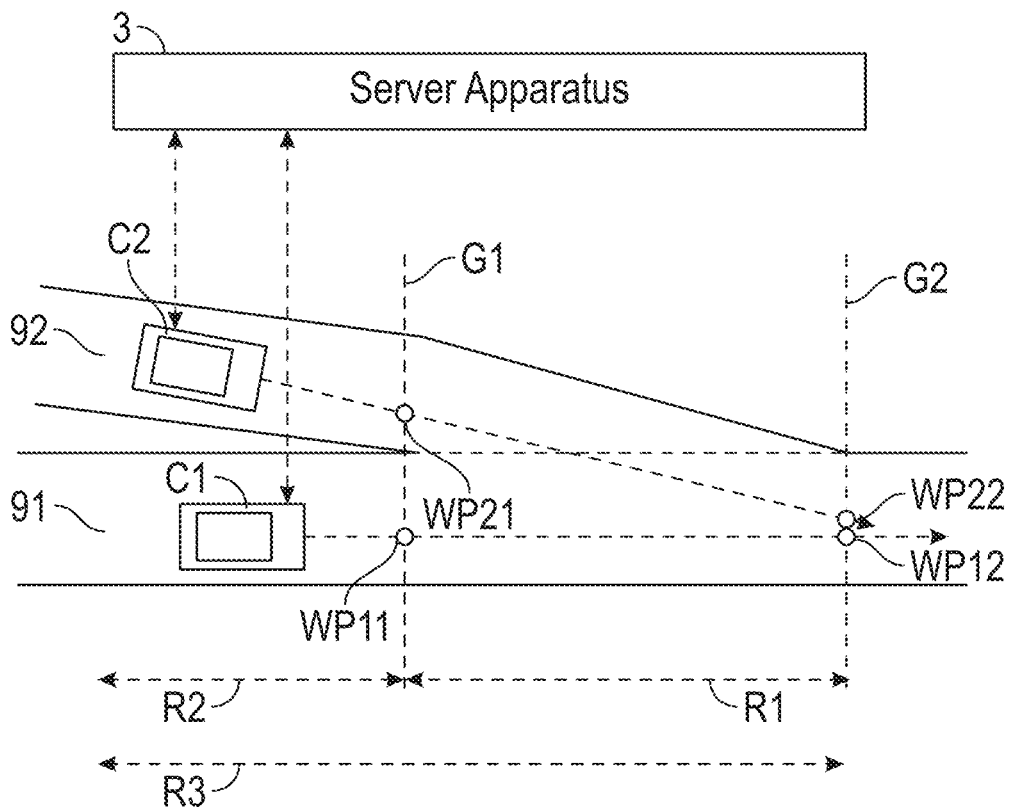
FIG. 9 is an explanatory diagram of a state in which a first automobile and a second automobile are traveling toward a merging section on a road.

FIG. 9 is an explanatory diagram of a state in which a first automobile C1 and a second automobile C2 are traveling toward the merging section on the road.

In FIG. 9, the first automobile C1 is traveling along a broken line in the figure on the main lane 91 of the pre-merger section R2, and traveling toward the merging section R1. Moreover, the second automobile C2 is traveling along a broken line in the figure on the merging lane 92 in the pre-merger section R2, and traveling toward the merging section R1. The first automobile C1 and the second automobile C2 are traveling side by side at the substantially same speed. Furthermore, the set merging section R3 to be used by the server apparatus 3 in the control includes the merging section R1 and the pre-merger section R2 on the road.

When such travel environment occurs, the controller 42 of the server apparatus 3 determines that the first automobile C1 and the second automobile C2 interfere with each other in the merging section R1.

Moreover, in FIG. 9, G1 indicates a starting position of the merging section R1. G2 indicates an end position of the merging section R1. WP11 is a first waypoint at which the first automobile C1 passes by the starting position G1 of the merging section. WP12 is a second waypoint at which the first automobile C1 passes by the end position G2 of the merging section. WP21 is a third waypoint at which the second automobile C2 passes by the starting position G1 of the merging section. WP22 is a fourth waypoint at which the second automobile C2 passes by the end position G2 of the merging section.

For example, as for the first automobile C1, the controller 42 of the server apparatus 3 generates a position of the first waypoint WP11 and the passage time, and a position of the second waypoint WP12 and the passage time, as the waypoint information. The controller 42 individually transmits the generated waypoint information to the first automobile C1.

For example, as for the second automobile C2, the controller 42 of the server apparatus 3 generates a position of the third waypoint WP21 and the passage time, and a position of the fourth waypoint WP22 and the passage time, as the waypoint information. The controller 42 individually transmits the generated waypoint information to the second automobile C2.

It is to be noted that the controller 42 may include information regarding three or more waypoints in the waypoint information to be individually transmitted to each automobile 2.

Figure 10:
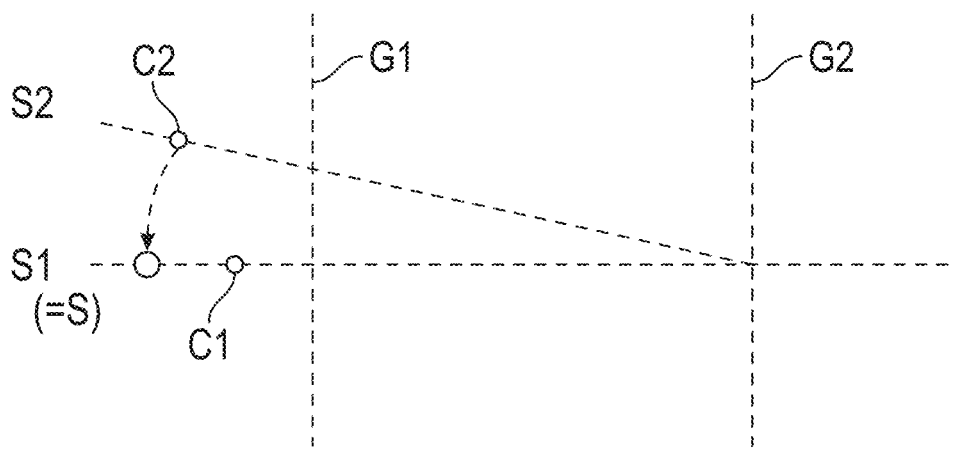
FIG. 10 is an explanatory diagram of pre-processing in which a controller of the server apparatus determines interference between the first automobile traveling along a main lane of the merging section in FIG. 9 and the second automobile traveling along a merging lane.

FIG. 10 is an explanatory diagram of pre-processing for the controller 42 of the server apparatus 3 to determine the interference between the first automobile C1 traveling on the main lane 91 in the merging section in FIG. 9 and the second automobile C2 traveling on the merging lane 92.

In FIG. 10, the main lane 91 in the merging section in FIG. 9 is represented by a main lane segment S1 in a broken line, and the merging lane 92 is represented by a merging lane segment S2 in a broken line.

The merging lane segment S2 crosses the main lane segment S1 at the end position G2 of the merging section. It is possible for the second automobile C2 traveling on the merging lane 92 to travel and pass through the merging section by making a lane change from the merging lane 92 to the main lane 91 between the starting position G1 of the merging section and the end position G2 of the merging section.

In this case, to determine the interference, the controller 42 plots the first automobile C1, as indicated by a black dot in the figure, on the main lane segment S1 at a position away from the end position G2 of the merging section by a real distance at the time of the processing.

Moreover, the controller 42 is configured to plot the second automobile C2, as indicated by a black dot in the figure, on the merging lane segment S2 at a position away from the end position G2 of the merging section by a real distance at the time of the processing. However, the controller 42 plots the second automobile C2, as indicated by a white dot in the figure, on the main lane segment S1 at a position away from the end position G2 of the merging section by the real distance at the time of the processing.

By using such a main lane segment S1 in FIG. 10, the controller 42 determines the presence or absence of the interference between the first automobile C1 and the second automobile C2.

FIG. 11 is an explanatory diagram of an S-chart for the control of the first automobile C1 and the second automobile C2 in FIG. 9.

The S-chart indicates the positions and future predictions of the multiple automobiles 2 on the road at the certain time. By using the S-chart, the controller 42 periodically determines, for example, the interference in, for example, the merging section with respect to each automobile 2.

The vertical axis in FIG. 11 indicates time, and time elapses as goes downward. The horizontal axis represents the S-position on the road. The horizontal axis in FIG. 11 corresponds to the main lane segment S1 in FIG. 10.

In FIG. 11, the first automobile C1 traveling on the main lane 91 is moving on the main lane 91 at a first speed. Moreover, the second automobile C2 traveling on the merging lane 92 is moving on the merging lane 92 at a second speed higher than the first speed. In this case, a future expected route of the second automobile C2 has a smaller inclination than that of a line segment of a future expected route of the first automobile C1, as illustrated as a line segment of the second automobile C2 in the figure.

Moreover, as indicated by a broken line circle in the figure, there is possibility that the first automobile C1 and the second automobile C2 interfere with each other at a position inside the merging section R1 on the road.

For this reason, as for the first automobile C1, the controller 42 of the server apparatus 3 continue to generate the individual control information to allow the first automobile C1 to pass through the merging section while maintaining the first speed (Maintain).

Moreover, as for the second automobile C2, the controller 42 generates the individual control information to allow the second automobile C2 to decelerate (Dec) to secure an inter-vehicle distance with respect to the first automobile C1. Next, the controller 42 generates the individual control information to allow the second automobile C2 to accelerate (Acc) to the first speed. Next, the controller 42 generates the individual control information to allow the second automobile C2 as well to pass through the merging section while maintaining the first speed (Maintain).

Thus, it is possible the first automobile C1 and the second automobile C2 to safely pass through the merging section without actually causing interference in the merging section.

Moreover, as described above, as for the first automobile C1, the controller 42 generates the position of the first waypoint WP11 and the passage time, and the position of the second waypoint WP12 and the passage time, as the waypoint information. The controller 42 individually transmits the waypoint information to the first automobile C1. Moreover, as for the second automobile C2, the controller 42 generates the position of the third waypoint WP21 and the passage time, and the position of the fourth waypoint WP22 and the passage time, as the waypoint information. The controller 42 individually transmits the waypoint information to the second automobile C2.

Under such circumstances, when the communication state with the server apparatus 3 becomes non-optimal, the travel control device 12 of each of the first automobile C1 and the second automobile C2 carries out the travel control based on respective pieces of the waypoint information that has been already received.

Furthermore, the travel control device 12 of each of the first automobile C1 and the second automobile C2 receives the information regarding at least two or more waypoints. Accordingly, the travel control device 12 of each of the first automobile C1 and the second automobile C2 reproduces the route indicated by the solid line in FIG. 11, as the subject-vehicle route. The travel control device 12 of each of the first automobile C1 and the second automobile C2 carries out the control to allow the first automobile C1 or the second automobile C2 to travel along the route under the control of the server apparatus 3 even in a state where the communication with the server apparatus 3 is interrupted. It is possible for the first automobile C1 and the second automobile C2 to actually travel along the routes respectively assumed by the server apparatus 3 to suppress the interference.

In contrast, in a case with the waypoint information regarding only one waypoint, there is possibility that the travel control device 12 generates a route different from the route indicated by the solid line in FIG. 11. The travel control device 12 is also able to generate a route that bends at a different inclination from that illustrated in the figure. When such a subject-vehicle route different from that assumed by the server apparatus 3 is generated, actual travel routes become different from that assumed by the server apparatus 3 to suppress the interference, even when the travel control device 12 of each of the first automobile C1 and the second automobile C2 carries out the travel control under the control of the server apparatus 3 while the communication with the server apparatus 3 is interrupted. In this case, the interference is not necessarily suppressed.

As described, the controller 42 of the server apparatus 3 generates the waypoint information, at least with respect to each automobile 2 traveling in the pre-merger section R2 short of the merging section R1 on the road. The controller 42 of the server apparatus 3 individually transmits the waypoint information to each automobile 2. Moreover, as the waypoint information regarding each automobile 2, the controller 42 of the server apparatus 3 generates the waypoint information including the positions of the at least two waypoints and the passage time at each waypoint. The at least two waypoints include a starting point and the end point of the merging section R1 on the road. This makes it possible for the travel control device 12 of each automobile 2 to reproduce the route assumed by the server apparatus 3 to suppress the interference, as the subject-vehicle route, and to allow the subject vehicle to travel along the reproduced route along the route assumed by the server apparatus 3. Each of the multiple automobiles 2 traveling in the merging section carries out such a control under the control, making it possible for the multiple automobiles 2 to safely pass through the merging section without causing the interference in the merging section, even in the state where the communication with the server apparatus 3 is interrupted.

As described above, in the present embodiment, for the individual control of the multiple automobiles 2, the server apparatus 3 determines the interference with other automobiles based on the travel information regarding the multiple automobiles 2 held in the server DB 5, with respect to each automobile 2 traveling toward the merging section where the automobiles 2 merge. The server apparatus 3 generates the individual control information including the determination result as to the interference, as the individual control information regarding each automobile 2 traveling toward the merging section R1. The server apparatus 3 individually transmits the individual control information to each automobile 2 traveling toward the merging section R1. This makes it possible for each of the multiple automobiles 2 to control the travel of the subject vehicle by using the individual control information individually generated for each automobile by the server apparatus 3. As to the travel of the multiple automobiles 2, it is possible to allow the multiple automobiles 2 to travel under the control of the server apparatus 3 without causing the interference with other automobiles even when traveling in, for example, the merging section R1.

Moreover, the server apparatus 3 further generates the waypoint information regarding the multiple points to be passed through in the merging section R1, with respect to the automobile 2 traveling toward the merging section R1. The multiple points are points closer to the end position G2 of the merging section R1 than the current position at the time of the processing. The server apparatus 3 individually transmits the waypoint information.

This makes it possible for each automobile 2 to carry out the autonomous travel control along the route assumed by the server apparatus 3, by using the waypoint information in the merging section R1 that has been already received from the server apparatus 3 that carries out the control, even when the automobile 2 is prevented from receiving a new piece of the individual control information because of, for example, temporary interruption of the communication with the server apparatus 3 and prevented from carrying out the travel control based on the control by using the individual control information from the server apparatus 3.

Moreover, after that, when the automobile 2 becomes able to receive the individual control information from the server apparatus 3, because the previous autonomous travel uses the waypoint information received from the server apparatus 3 that carries out the control, it is possible to easily switch the travel control of each automobile 2 to restore the travel control based on the individual control information from the server apparatus 3. The travel controls before and after the switching of the control are both based on the information generated by the server apparatus 3 that carries out the control. It is possible to easily ensure continuity of the control on the occasion of the switching. Accordingly, the travel of the automobile 2 on the occasion of the switching of the control is inhibited from making switching of the control that causes a discontinuous change in the travel that may result in a significant change in the travel. Each automobile 2 carries out the autonomous travel under the control of the server apparatus 3 even when each automobile 2 is inhibited from receiving a new piece of the individual control information from the server apparatus 3. This makes it possible to smoothly restore the travel control based on the individual control information from the server apparatus 3.

In this way, in the control system 1 for automobiles, it is possible to maintain the control under the control, even when a state occurs in which the communication between the server apparatus 3 and each automobile 2 is temporarily interrupted. It is possible to maintain safety by the control as much as possible.

Here, description is given of specific examples of the determination as to the interference when the first automobile C1 traveling on the main lane 91 and the second automobile C2 traveling on the merging lane 92 merge.

The S-charts illustrated in FIGS. 12 to 20 below are similar to that illustrated in FIG. 11.

FIG. 12 is an explanatory diagram of an S-chart of a first example of an interference determination between the first automobile C1 and the second automobile C2 that merge.

FIG. 12 is an example where the second automobile C2 traveling on the merging lane 92 merges in front of the first automobile C1 traveling on the main lane 91. Moreover, the second automobile C2 is traveling at a higher speed than the first automobile C1.

Furthermore, when the second automobile C2 and the first automobile C1 continue to travel as are at the current time, the line segment of the first automobile C1 and the line segment of the second automobile C2 do not approach or cross each other between the starting position G1 and the end position G2 of the merging section R1. Here, to approach may mean, for example, to approach with the smallest inter-vehicle distance or less.

In this case, the controller 42 of the server apparatus 3 determines that the second automobile C2 and the first automobile C1 do not interfere with each other in the merging section R1.

FIG. 13 is an explanatory diagram of an S-chart of a second example of the interference determination between the first automobile C1 and the second automobile C2 that merge.

FIG. 13 is an example where the second automobile C2 traveling on the merging lane 92 merges in front of the first automobile C1 traveling on the main lane 91. Moreover, the second automobile C2 is traveling at a lower speed than the first automobile C1.

Furthermore, when the second automobile C2 and the first automobile C1 continue to travel as are at the current time, the line segment of the first automobile C1 and the line segment of the second automobile C2 do not approach or cross each other in the merging section R1.

In this case, the controller 42 of the server apparatus 3 determines that the second automobile C2 and the first automobile C1 do not interfere with each other in the merging section R1.

FIG. 14 is an explanatory diagram of an S-chart of a third example of the interference determination between the first automobile C1 and the second automobile C2 that merge.

FIG. 14 is an example where the second automobile C2 traveling on the merging lane 92 merges in front of the first automobile C1 traveling on the main lane 91. Moreover, the second automobile C2 is traveling at substantially the same speed as the first automobile C1.

Furthermore, when the second automobile C2 and the first automobile C1 continue to travel as are at the current time, the line segment of the first automobile C1 and the line segment of the second automobile C2 do not approach or cross each other in the merging section R1.

In this case, the controller 42 of the server apparatus 3 determines that the second automobile C2 and the first automobile C1 do not interfere with each other in the merging section R1.

FIG. 15 is an explanatory diagram of an S-chart of a fourth example of the interference determination between the first automobile C1 and the second automobile C2 that merge.

FIG. 15 is an example where the second automobile C2 traveling on the merging lane 92 merges behind the first automobile C1 traveling on the main lane 91. Moreover, the second automobile C2 is traveling at a higher speed than the first automobile C1.

Furthermore, when the second automobile C2 and the first automobile C1 continue to travel as are at the current time, the line segment of the first automobile C1 and the line segment of the second automobile C2 cross each other in the merging section R1.

In this case, the controller 42 of the server apparatus 3 determines that the second automobile C2 and the first automobile C1 interfere with each other in the merging section R1.

For example, as for the second automobile C2, the controller 42 generates information regarding the third waypoint WP21 and the fourth waypoint WP22, and individually transmits the information to the second automobile C2. The information allows the second automobile C2 to decelerate in front of the merging section R1 to merge away from the first automobile C1, and travel in the merging section R1 at the same speed as the first automobile C1.

In this case, it is possible for the second automobile C2 to carry out the autonomous travel control, as indicated by a broken line in the figure, to travel rearward of the first automobile C1 in the merging section R1, and pass by the third waypoint WP21 and the fourth waypoint WP22.

FIG. 16 is an explanatory diagram of an S-chart of a fifth example of the interference determination between the first automobile C1 and the second automobile C2 that merge.

FIG. 16 is an example where the second automobile C2 traveling on the merging lane 92 merges in front of the first automobile C1 traveling on the main lane 91. Moreover, the second automobile C2 is traveling at a lower speed than the first automobile C1.

Furthermore, when the second automobile C2 and the first automobile C1 continue to travel as are at the current time, the line segment of the first automobile C1 and the line segment of the second automobile C2 cross each other in the merging section R1.

In this case, the controller 42 of the server apparatus 3 determines that the second automobile C2 and the first automobile C1 interfere with each other in the merging section R1.

For example, as for the second automobile C2, the controller 42 generates information regarding the third waypoint WP21 and the fourth waypoint WP22, and individually transmits the information to the second automobile C2. The information allows the second automobile C2 to decelerate in front of the merging section R1 to merge away from the first automobile C1, restore the original speed, and travel in the merging section R1.

In this case, it is possible for the second automobile C2 to carry out the autonomous travel control, as indicated by a broken line in the figure, to travel rearward of the first automobile C1 in the merging section R1, and pass by the third waypoint WP21 and the fourth waypoint WP22.

FIG. 17 is an explanatory diagram of an S-chart of a sixth example of the interference determination between the first automobile C1 and the second automobile C2 that merge.

FIG. 17 is an example where the second automobile C2 traveling on the merging lane 92 merges in front of the first automobile C1 traveling on the main lane 91. Moreover, the second automobile C2 is traveling at substantially the same speed as the first automobile C1.

Furthermore, when the second automobile C2 and the first automobile C1 continue to travel as are at the current time, the line segment of the first automobile C1 and the line segment of the second automobile C2 approach each other in the merging section R1.

In this case, the controller 42 of the server apparatus 3 determines that the second automobile C2 and the first automobile C1 interfere with each other in the merging section R1.

For example, as for the second automobile C2, the controller 42 generates information regarding the third waypoint WP21 and the fourth waypoint WP22, and individually transmits the information to the second automobile C2. The information allows the second automobile C2 to decelerate in front of the merging section R1 to merge away from the first automobile C1, restore the original speed, and travel in the merging section R1.

In this case, it is possible for the second automobile C2 to carry out the autonomous travel control, as indicated by a broken line in the figure, to travel rearward of the first automobile C1 in the merging section R1, and pass by the third waypoint WP21 and the fourth waypoint WP22.

FIG. 18 is an explanatory diagram of an S-chart of a seventh example of the interference determination between the first automobile C1 and the second automobile C2 that merge.

FIG. 18 is an example where the second automobile C2 traveling on the merging lane 92 merges behind the first automobile C1 traveling on the main lane 91. Moreover, the second automobile C2 is traveling at a higher speed than the first automobile C1.

Furthermore, when the second automobile C2 and the first automobile C1 continue to travel as are at the current time, the line segment of the first automobile C1 and the line segment of the second automobile C2 cross each other after passing through the merging section R1.

In this case, the controller 42 of the server apparatus 3 determines that the second automobile C2 and the first automobile C1 do not interfere with each other in the merging section R1.

It is to be noted that, for example, as for the second automobile C2, the controller 42 may generate information regarding the fourth waypoint WP22, and individually transmit the information to the second automobile C2. The information allows the second automobile C2 to decelerate to be separated away from the first automobile C1 in the merging section R1.

In this case, the travel control device 12 of the second automobile C2 may carry out the travel control, as indicated by a broken line in the figure, to direct the second automobile C2 toward the fourth waypoint WP22 from the middle of the merging section R1.

FIG. 19 is an explanatory diagram of an S-chart of an eighth example of the interference determination between the first automobile C1 and the second automobile C2 that merge.

FIG. 19 is an example where the second automobile C2 traveling on the merging lane 92 merges behind the first automobile C1 traveling on the main lane 91. Moreover, the second automobile C2 is traveling at a lower speed than the first automobile C1.

Furthermore, when the second automobile C2 and the first automobile C1 continue to travel as are at the current time, the line segment of the first automobile C1 and the line segment of the second automobile C2 do not approach or cross each other in the merging section R1.

In this case, the controller 42 of the server apparatus 3 determines that the second automobile C2 and the first automobile C1 do not interfere with each other in the merging section R1.

FIG. 20 is an explanatory diagram of an S-chart of a ninth example of the interference determination between the first automobile C1 and the second automobile C2 that merge.

FIG. 20 is an example where the second automobile C2 traveling on the merging lane 92 merges behind the first automobile C1 traveling on the main lane 91. Moreover, the second automobile C2 is traveling at substantially the same speed as the first automobile C1.

Furthermore, when the second automobile C2 and the first automobile C1 continue to travel as are at the current time, the line segment of the first automobile C1 and the line segment of the second automobile C2 do not approach or cross each other in the merging section R1.

In this case, the controller 42 of the server apparatus 3 determines that the second automobile C2 and the first automobile C1 do not interfere with each other in the merging section R1.

Next, an example of a calculation method of the control value for the automobile 2 to pass by a waypoint is described.

FIG. 21 is an explanatory diagram of an example of an S-chart to be used in carrying out the travel control based on the waypoint in the automobile 2.

In the S-chart in FIG. 21, for the sake of explanation, the vertical axis represents the position S on the lane, and the horizontal axis represents time T.

The origin is the position and the time of the automobile 2 at timing when the travel control is carried out.

A first broken line passing through the origin is a travel path L1 for current travel keeping, when the automobile 2 maintains the control based on the current control value. Here, a case is given as an example where the automobile 2 is traveling at a constant speed.

A second broken line under the first broken line is a virtual travel path L2 along which the automobile 2 travels at a constant speed while passing by the first waypoint WP11 and the second waypoint WP12. Along the virtual travel path L2, the automobile 2 passes by a point s1 of the first waypoint WP11 at the time t1, and passes by a point s2 of the second waypoint WP12 at the time t2.

In this case, the travel control device 12 of the automobile 2 generates the virtual travel path L2 based on the first waypoint WP11 and the second waypoint WP12 acquired from the server apparatus 3.

Next, the travel control device 12 generates a target travel path TGT. As a curve indicated by a solid line in the figure, the target travel path TGT extends from the origin as the current position, and comes into contact with the virtual travel path L2 at the second waypoint WP12.

Based on the target travel path TGT, the travel control device 12 generates the control value for acceleration at the current time, to allow the automobile 2 to travel along the target travel path TGT.

FIG. 22 is an explanatory diagram of an example of calculation processing to obtain the control value of the acceleration rate of the automobile 2.

In the S-chart in FIG. 22, for the sake of explanation, the vertical axis represents the position S on the lane, and the horizontal axis represents time T.

The broken line in the figure is the travel path L1 for the current travel keeping, when the automobile 2 maintains the current travel. This may correspond to the travel path L1 for the current travel keeping in FIG. 21.

The solid line in the figure indicates the target travel path TGT.

Based on the relation in FIG. 22, it is possible for the travel control device 12 to calculate a difference α between the travel path L1 for the current travel keeping and the target travel path TGT at the control timing indicated by dots in the figure.

The black dots illustrated in the figure indicate a future position taken as a target at control timing on the target travel path TGT and a future position taken as a target at the control timing on the travel path L1 for the current travel keeping.

In this case, it suffices that the travel control device 12 of the automobile 2 located at the position of the origin in FIG. 22 calculates the acceleration rate that allows the subject vehicle to travel toward a target position, and calculates the control value of the acceleration rate corresponding to the acceleration rate.

It is possible to express the target travel path TGT by, for example, the following Expression 1. By differentiating this twice, Expression 2 for the acceleration rate is obtained. Here, S is a position, t is time, and a to e are constants. The symbol ^ indicates multiplication. For example, "t^4" indicates the fourth power of t. S(FF)" is the acceleration rate. By Expression 2, it is possible to calculate the acceleration rate from the current position toward the target position, to head the automobile 2 for a position given by Expression 1 to which the automobile 2 is to be moved by the current control. Expression 2 is the acceleration rate S(FF)" toward the target position in the future. It is possible to use Expression 2 as a feed-forward term of the acceleration rate.

Moreover, the two target positions indicated by the two black dots in FIG. 22 have the difference α in the position on the S-axis. By using the difference α, it is possible to calculate the acceleration rate S(FB)" of the feed-forward term by the following Expression 3. Here, f( ) represents a mathematical function. Expression 3 is an acceleration rate S(FB)" to reduce a delay based on the difference between the current position and the target position. It is possible to use Expression 3 as a feedback term to compensate for a control delay of the acceleration rate.

The travel control device 12 of the present embodiment calculates a final acceleration rate by, for example, weighting and adding the acceleration rate S(FF)" in Expression 2 and the acceleration rate S(FB)" in Expression 3. The travel control device 12 of the present embodiment generates the control value of the acceleration rate corresponding to the final acceleration rate. In this case, it follows that a calculation expression to obtain the final acceleration rate includes, as the feed-forward term, the acceleration rate toward the target position on the target travel path TGT, and includes, as the feedback term, the acceleration rate corresponding to the difference α between the travel path L1 for the current travel keeping and the target travel path TGT. The calculation expression to obtain the final acceleration rate is to add the acceleration rate S(FF)" toward the target position by a feed-forward control. Thus, an overshoot or the like hardly occurs.

As described, it is possible for the travel control device 12 of the automobile 2 to generate the target travel path TGT as the subject-vehicle route based on the first waypoint WP11 and the second waypoint WP12 acquired from the server apparatus 3.

Moreover, it is possible for the travel control device 12 to calculate the acceleration rate necessary at each control timing, to allow the automobile 2 to travel along the target travel path TGT. Based on the acceleration rate, it is possible for the travel control device 12 to calculate the control value to be used in the travel control.

Furthermore, the acceleration rate to be used in generating this control value includes the feed-forward acceleration rate S(FF)" to allow the automobile 2 to travel along the target traveling path TGT, together with the feedback acceleration rate S(FB)" corresponding to the future difference α between the travel path L1 for the current travel keeping and the target travel path TGT. As a result, an overshoot or the like hardly occurs in the control value or the final acceleration rate to obtain the control value.

In contrast, for example, when the control value is generated solely based on the feedback acceleration rate S(FB)" corresponding to the future difference α between the travel path L1 for the current travel keeping and the target travel path TGT, the control delay easily becomes large. As a result, an overshoot easily occurs. The acceleration rate of the automobile 2 during the autonomous travel control becomes slightly variable, though not a major problem.

$$S = a \times t^4 + b \times t^3 + c \times t^2 + d \times t + e \quad \text{Expression 1}$$

$$S(FF)'' = 12 \times a \times t^2 + 6 \times b \times t + 2 \times c \quad \text{Expression 2}$$

$$S(FB)'' = f(\alpha) \quad \text{Expression 3}$$

Although the forgoing embodiments are preferred embodiments of the invention, the invention is by no means limited thereto. It should be appreciated that various modifications and alterations may be made without departing from the scope of the invention.

DESCRIPTION OF REFERENCE NUMERALS

1: Control system
2: Automobile (vehicle)
3: Server apparatus
4: Server main body
5: Server DB
6: Communication system
7: Base station
8: Communication network
10: Control system
11: Sensor control device
12: Travel control device
13: Driving control device
14: Steering control device
15: Braking control device
16: Vehicle outside communication control device
17: Vehicle network
21: GNSS receiver
22: Vehicle outside camera
23: Acceleration rate sensor
29: Vehicle communication device
31: Server communication device
32: Server GNSS receiver
33: Server memory
34: Server CPU
35: Server internal bus
41: Pre-processor
42: Controller
51: Server map data
53: Vehicle position behavior DB
71: Input output device
72: Vehicle memory
74: Vehicle map data
79: Vehicle internal bus
91: Main lane
92: Merging lane
110: GNSS satellites
C1: First automobile
C2: Second automobile
R1: Merging section
R2: Pre-merger section
R3: Set merging section
WP11: First waypoint
WP12: Second waypoint
WP21: Third waypoint
WP22: Fourth waypoint

The invention claimed is:

1. A control system for vehicles, the control system comprising:
multiple vehicles each including a travel controller configured to generate a control value to control travel of a vehicle as a subject vehicle; and
a server apparatus configured to generate individual control information regarding each of the multiple vehicles based on travel information regarding the multiple vehicles, and individually transmit the individual control information to each of the multiple vehicles, wherein
the travel controller of each of the vehicles is configured to, on a condition that the travel controller of each of the multiple vehicles receives the individual control information addressed to the subject vehicle from the server apparatus, repetitively generate the control value for a travel control of the subject vehicle by using the received individual control information addressed to the subject vehicle, to control the travel of the subject vehicle,
the travel controller being further configured to output the control value respectively to a driving control device, a braking control device, and a steering control device to control acceleration, deceleration, and steering of the subject vehicle based on the control value,
the server apparatus comprises:
a server communication device configured to receive the travel information from each of the multiple vehicles;
a database configured to accumulate and hold the travel information regarding each of the multiple vehicles;
a pre-processor configured to record, on a condition that the server communication device receives the travel information, information regarding at least a travel position of the vehicle related to the travel information, in the database; and
a control information generator configured to periodically generate the individual control information regarding each of the multiple vehicles by using the information held in the database, and the control information generator is configured to:
  determine interference with another vehicle, with respect to each of the vehicles traveling toward a merging section in which vehicles merge, based on the travel information regarding the multiple vehicles held in the database;
  generate, as the individual control information regarding each of the vehicles traveling toward the merging section, information including a determination result as to the interference, and individually transmits the individual control information; and
  further generate information regarding a waypoint to be passed by in the merging section, with respect to the vehicles traveling toward the merging section, and individually transmit the information regarding the waypoint together with the individual control information, to allow the vehicles to travel in the merging section by traveling to pass by the waypoint when the vehicles fail in optimally receiving the individual control information from the server apparatus in traveling in the merging section, the waypoint being a point closer to an end point of the merging section than a current position.

2. The control system for the vehicles according to claim 1, wherein the control information generator of the server apparatus is configured to generate, as the information regarding the waypoint in the merging section with respect to each of the vehicles, information including positions of at least two waypoints and passage time at each of the at least two waypoints.

3. The control system for the vehicles according to claim 2, wherein the control information generator of the server apparatus is configured to:
  generate the information regarding the waypoint, at least with respect to each of the vehicles traveling in a pre-merger section short of the merging section on a road, and individually transmit the information regarding the waypoint; and
  generate, as the information regarding the waypoint with respect to each of the vehicles, the information including the positions of the at least two waypoints and the passage time at each of the at least two waypoints, the at least two waypoints comprising a starting point and the end point of the merging section on the road.

4. The control system for the vehicles according to claim 3, wherein
  each of the vehicles comprises a vehicle communication device configured to receive the individual control information from the server apparatus,
  the travel controller is configured to determine, when traveling toward the merging section and when traveling in the merging section, whether or not a state of receipt of the individual control information from the server apparatus by the vehicle communication device is optimal,
  the travel controller is configured to, in a state in which the vehicle communication device is able to optimally receive the individual control information from the server apparatus, generate the control value to suppress the interference, by using the latest individual control information, and
  the travel controller is configured to, in a state in which the vehicle communication device fails in optimally receiving the individual control information from the server apparatus, generate the control value to allow the subject vehicle to travel to pass by the waypoint, by using the received information regarding the waypoint.

5. The control system for the vehicles according to claim 4, wherein the travel controller of each of the vehicles is configured to:
  acquire, as the information regarding the waypoint addressed to the subject vehicle, the information including the positions of the at least two waypoints and the passage time at each of the at least two waypoints, and generates a subject-vehicle route that allows the subject vehicle to pass by the two waypoints at the passage time at each of the at least two waypoints; and
  generate the control value to allow the subject vehicle to travel following the subject-vehicle route.

6. The control system for the vehicles according to claim 5, wherein the travel controller of each of the vehicles is configured to, when generating the subject-vehicle route in the merging section, continue an autonomous travel control following the subject-vehicle route, until passing through the merging section, or until passing by the end point of the merging section received from the server apparatus.

7. The control system for the vehicles according to claim 6, wherein the travel controller of each of the vehicles is configured to:
  generate, as the subject-vehicle route, a target travel path from the current position, the target travel path allowing the subject vehicle to pass by the waypoint acquired from the server apparatus; and
  calculate the control value to be used in the travel control, based on an acceleration rate obtained by calculation including a feed-forward term to head toward a future position on the target travel path.

8. The control system for the vehicles according to claim 2, wherein the travel controller of each of the vehicles is configured to;
  acquire, as the information regarding the waypoint addressed to the subject vehicle, the information including the positions of the at least two waypoints and the passage time at each of the at least two waypoints, and generates a subject-vehicle route that allows the subject vehicle to pass by the two waypoints at the passage time at each of the at least two waypoints; and
  generate the control value to allow the subject vehicle to travel following the subject-vehicle route.

9. The control system for the vehicles according to claim 8, wherein the travel controller of each of the vehicles is configured to, when generating the subject-vehicle route in the merging section, continue an autonomous travel control following the subject-vehicle route, until passing through the merging section, or until passing by the end point of the merging section received from the server apparatus.

10. The control system for the vehicles according to claim 9, wherein the travel controller of each of the vehicles is configured to:
  generate, as the subject-vehicle route, a target travel path from the current position, the target travel path allowing the subject vehicle to pass by the waypoint acquired from the server apparatus; and
  calculate the control value to be used in the travel control, based on an acceleration rate obtained by calculation including a feed-forward term to head toward a future position on the target travel path.

11. The control system for the vehicles according to claim 2, wherein
  each of the vehicles comprises a vehicle communication device configured to receive the individual control information from the server apparatus, the travel controller is configured to determine, when traveling toward the merging section and when traveling in the merging section, whether or not a state of receipt of the individual control information from the server apparatus by the vehicle communication device is optimal, the travel controller is configured to, in a state in which the vehicle communication device is able to optimally receive the individual control information from the server apparatus, generate the control value to suppress the interference, by using the latest individual control information, and the travel controller is configured to, in a state in which the vehicle communication device fails in optimally receiving the individual control information from the server apparatus, generate the control value to allow the subject vehicle to travel to pass by the waypoint, by using the received information regarding the waypoint.

12. The control system for the vehicles according to claim 11, wherein the travel controller of each of the vehicles is configured to:

acquire, as the information regarding the waypoint addressed to the subject vehicle, the information including the positions of the at least two waypoints and the passage time at each of the at least two waypoints, and generates a subject-vehicle route that allows the subject vehicle to pass by the two waypoints at the passage time at each of the at least two waypoints; and generate the control value to allow the subject vehicle to travel following the subject-vehicle route.

13. The control system for the vehicles according to claim 12, wherein the travel controller of each of the vehicles is configured to, when generating the subject-vehicle route in the merging section, continue an autonomous travel control following the subject-vehicle route, until passing through the merging section, or until passing by the end point of the merging section received from the server apparatus.

14. The control system for the vehicles according to claim 13, wherein the travel controller of each of the vehicles is configured to:

generate, as the subject-vehicle route, a target travel path from the current position, the target travel path allowing the subject vehicle to pass by the waypoint acquired from the server apparatus; and calculate the control value to be used in the travel control, based on an acceleration rate obtained by calculation including a feed-forward term to head toward a future position on the target travel path.

15. The control system for the vehicles according to claim 1, wherein each of the vehicles comprises a vehicle communication device configured to receive the individual control information from the server apparatus, the travel controller is configured to determine, when traveling toward the merging section and when traveling in the merging section, whether or not a state of receipt of the individual control information from the server apparatus by the vehicle communication device is optimal, the travel controller is configured to, in a state in which the vehicle communication device is able to optimally receive the individual control information from the server apparatus, generate the control value to suppress the interference, by using the latest individual control information, and the travel controller is configured to, in a state in which the vehicle communication device fails in optimally receiving the individual control information from the server apparatus, generate the control value to allow the subject vehicle to travel to pass by the waypoint, by using the received information regarding the waypoint.

16. A control system for vehicles, the control system comprising:

multiple vehicles each including a travel controller that generates a control value to control travel of a vehicle as a subject vehicle; and a server apparatus configured to generate individual control information regarding each of the multiple vehicles based on travel information regarding the multiple vehicles, and individually transmit the individual control information to each of the multiple vehicles, wherein the travel controller of each of the multiple vehicles is configured to, on a condition that the travel controller of each of the multiple vehicles receives the individual control information addressed to the subject vehicle from the server apparatus, repetitively generate the control value for a travel control of the subject vehicle by using the received individual control information addressed to the subject vehicle, to control the travel of the subject vehicle, the travel controller being further configured to output the control value respectively to a driving control device, a braking control device, and a steering control device to control acceleration, deceleration, and steering of the subject vehicle based on the control value, the server apparatus comprises:

a server communication device configured to receive the travel information from each of the multiple vehicles;

a database configured to accumulate and hold the travel information regarding each of the multiple vehicles;

a pre-processor configured to record, on a condition that the server communication device receives the travel information, information regarding at least a travel position of the vehicle related to the travel information, in the database; and a control information generator configured to periodically generate the individual control information regarding each of the multiple vehicles by using the information held in the database, the control information generator is configured to:

determine interference with another vehicle, with respect to each of the vehicles traveling toward a merging section in which vehicles merge, based on the travel information regarding the multiple vehicles held in the database;

generate, as the individual control information regarding each of the vehicles traveling toward the merging section, information including a determination result as to the interference, and individually transmit the individual control information; and further generate information regarding a waypoint to be passed by in the merging section, with respect to the vehicles traveling toward the merging section, and individually transmit the information regarding the waypoint, the waypoint being a point closer to an end point of the merging section than a current position, each of the vehicles comprises a vehicle communication device configured to receive the individual control information from the server apparatus, the travel controller is configured to determine, when traveling toward the merging section and when traveling in the merging section, whether or not a state of receipt of the individual control information from the server apparatus by the vehicle communication device is optimal, the travel controller is configured to, in a state in which the vehicle communication device is able to optimally receive the individual control information from the server apparatus, generate the control value to suppress the interference, by using the latest individual control information, and the travel controller is configured to, in a state in which the vehicle communication device fails in optimally receiving the individual control information from the server apparatus, generate the control value to allow the subject vehicle to travel to pass by the waypoint, by using the received information regarding the waypoint.

17. A control system for vehicles, the control system comprising:

multiple vehicles each including first circuitry configured to generate a control value to control travel of a vehicle as a subject vehicle; and a server including second circuitry configured to generate individual control information regarding each of the multiple vehicles based on travel information regarding the multiple vehicles, and individually transmit the individual control information to each of the multiple vehicles, wherein the first circuitry of each of the vehicles is configured to, on a condition that the travel controller of each of the multiple vehicles receives the individual control information addressed to the subject vehicle from the server, repetitively generate the control value for a travel control of the subject vehicle by using the received individual control information addressed to the subject vehicle, to control the travel of the subject vehicle, the first circuitry being further configured to output the control value respectively to a driving control device, a braking control device, and a steering control device to control acceleration, deceleration, and steering of the subject vehicle based on the control value, the server is configured to:
receive the travel information from each of the multiple vehicles via a server communication device;
accumulate and hold the travel information regarding each of the multiple vehicles in a database;
record, on a condition that the server communication device receives the travel information, information regarding at least a travel position of the vehicle related to the travel information, in the database; and
periodically generate the individual control information regarding each of the multiple vehicles by using the information held in the database, and the server is configured, when periodically generating the individual control information regarding each of the multiple vehicles, to:
determine interference with another vehicle, with respect to each of the vehicles traveling toward a merging section in which vehicles merge, based on the travel information regarding the multiple vehicles held in the database;
generate, as the individual control information regarding each of the vehicles traveling toward the merging section, information including a determination result as to the interference, and individually transmits the individual control information; and
further generate information regarding a waypoint to be passed by in the merging section, with respect to the vehicles traveling toward the merging section, and individually transmit the information regarding the waypoint together with the individual control information, to allow the vehicles to travel in the merging section by traveling to pass by the waypoint when the vehicles fail in optimally receiving the individual control information from the server in traveling in the merging section, the waypoint being a point closer to an end point of the merging section than a current position.

* * * * *